(12) United States Patent
Zhang et al.

(10) Patent No.: US 10,211,901 B2
(45) Date of Patent: Feb. 19, 2019

(54) WIRELESS COMMUNICATIONS METHOD AND APPARATUS FOR SPATIAL SHARING USING CARRIER SENSE MULTIPLE ACCESS WIRELESS MEDIUM ACCESS

(71) Applicant: INTERDIGITAL PATENT HOLDINGS, INC., Wilmington, DE (US)

(72) Inventors: Guodong Zhang, Syosset, NY (US); Hanqing Lou, Syosset, NY (US); Xiaofei Wang, Cedar Grove, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 3 days.

(21) Appl. No.: 15/510,127

(22) PCT Filed: Sep. 11, 2015

(86) PCT No.: PCT/US2015/049744
§ 371 (c)(1),
(2) Date: Mar. 9, 2017

(87) PCT Pub. No.: WO2016/040837
PCT Pub. Date: Mar. 17, 2016

(65) Prior Publication Data
US 2017/0294949 A1 Oct. 12, 2017

Related U.S. Application Data

(60) Provisional application No. 62/049,357, filed on Sep. 11, 2014, provisional application No. 62/073,689, filed on Oct. 31, 2014.

(51) Int. Cl.
*H04B 7/06* (2006.01)
*H04W 74/08* (2009.01)
(Continued)

(52) U.S. Cl.
CPC ........ *H04B 7/0617* (2013.01); *H04J 11/0023* (2013.01); *H04W 52/46* (2013.01); *H04W 74/0808* (2013.01); *H04W 74/0816* (2013.01)

(58) Field of Classification Search
CPC .. H04B 7/0617; H04J 11/0023; H04W 52/46; H04W 74/0808; H04W 74/0816; H04W 74/0825
See application file for complete search history.

(56) References Cited

U.S. PATENT DOCUMENTS

| 9,860,908 B2 * | 1/2018 | Wang .................. H04W 72/121 |
| 2003/0022686 A1 * | 1/2003 | Soomro ............... H04L 1/0026 455/522 |

(Continued)

FOREIGN PATENT DOCUMENTS

EP   1 530 316   5/2005

OTHER PUBLICATIONS

IEEE Std. 802.11-2012, IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

(Continued)

Primary Examiner — Devan Sandiford
(74) Attorney, Agent, or Firm — Volpe and Koenig, P.C.

(57) ABSTRACT

To facilitate spatial sharing, signaling may be used. A first node may receive one or more frame exchanges between a second node and a third node, wherein the second node is associate with the third node. The first node may then detect a spatial sharing scenario (SSS) with an overlapping basic service set (BSS) based on the received one or more frame exchanges. Also, the first node may transmit a directional (Continued)

poll request to at least a fourth node associated with the first node based on the detected SSS, and thereby null directional transmissions associated with the second node, the third node or both. The first node may then receive a direction poll response from the fourth node. Further, the first node may transmit one or more directional, beamformed transmissions to the fourth node simultaneously with directional, beamformed transmissions by the second node to the third node.

18 Claims, 17 Drawing Sheets

(51) Int. Cl.
*H04J 11/00* (2006.01)
*H04W 52/46* (2009.01)

(56) References Cited

U.S. PATENT DOCUMENTS

| | | | | |
|---|---|---|---|---|
| 2003/0156592 | A1* | 8/2003 | Ojard | H04B 1/0053 370/419 |
| 2003/0156656 | A1* | 8/2003 | Ojard | H04L 1/04 375/295 |
| 2004/0080415 | A1* | 4/2004 | Sorensen | G01V 3/12 340/541 |
| 2008/0192707 | A1* | 8/2008 | Xhafa | H04W 74/0808 370/336 |
| 2009/0109938 | A1* | 4/2009 | Singh | H04W 74/0816 370/337 |
| 2010/0014457 | A1* | 1/2010 | Nandagopalan | H04W 16/28 370/328 |
| 2011/0014910 | A1* | 1/2011 | Yonge, III | H04W 74/0808 455/434 |
| 2013/0016759 | A1* | 1/2013 | Hui | H04B 1/713 375/135 |
| 2013/0230035 | A1* | 9/2013 | Grandhi | H04W 48/16 370/338 |
| 2014/0328249 | A1* | 11/2014 | Vermani | H04L 69/323 370/328 |
| 2016/0112107 | A1* | 4/2016 | Wang | H04L 1/00 370/329 |
| 2016/0192395 | A1* | 6/2016 | Yoo | H04W 74/0808 370/329 |
| 2017/0055160 | A1* | 2/2017 | Barriac | H04W 16/14 |
| 2017/0064739 | A1* | 3/2017 | Hedayat | H04W 74/0816 |
| 2017/0127424 | A1* | 5/2017 | Kherani | H04W 72/08 |
| 2017/0332368 | A1* | 11/2017 | Einhaus | H04W 72/048 |
| 2018/0049038 | A1* | 2/2018 | Krunz | H04W 72/082 |

OTHER PUBLICATIONS

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

Xu et al., "A Novel Link Scheduling Strategy for Concurrent Transmission in mmWave WPANs Based on Beamforming Information," IEEE Wireless Communications and Networking Conference, pp. 1709-1714 (Apr. 2014).

Aboul-Magd, "802.11 HEW SG Proposed PAR," IEEE P802.11, Wireless LANs, IEEE 802.11-14/0165r1 (Mar. 2014).

Wang et al., "HEW Beamforming Enhancements," IEEE 802.11-13/0877r1 (Jul. 2013).

Park, "Proposed Specification Framework for TGah," IEEE P802.11, Wireless LANs, IEEE 802.11-11/1137r12 (Nov. 2012).

IEEE P802.11ah/D2.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 6: Sub 1 GHz License Exempt Operation, IEEE P802.11ah/D2.0 (Jun. 2014).

* cited by examiner

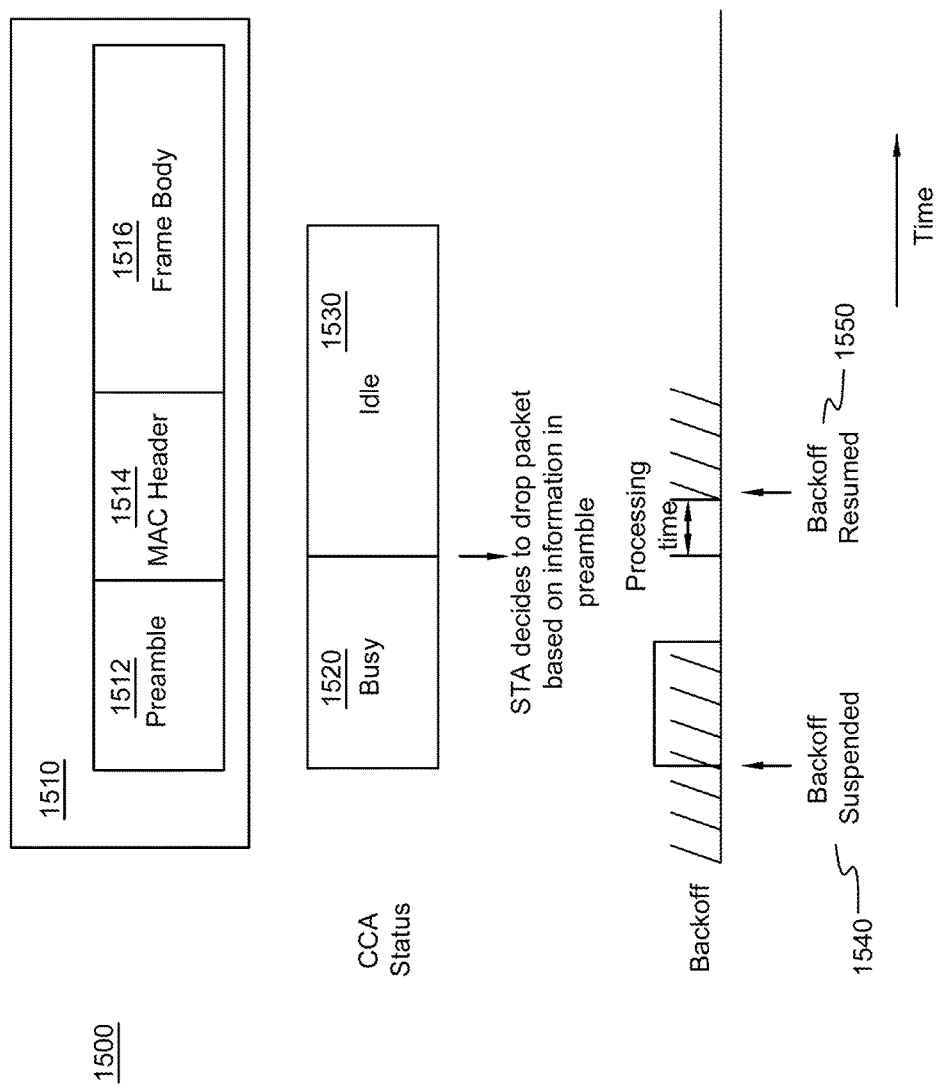

WIRELESS COMMUNICATIONS METHOD AND APPARATUS FOR SPATIAL SHARING USING CARRIER SENSE MULTIPLE ACCESS WIRELESS MEDIUM ACCESS

CROSS REFERENCE TO RELATED APPLICATIONS

This application is the U.S. National Stage, under 35 U.S.C. § 371, of International Application No. PCT/US2015/049744 filed Sep. 11, 2015, which claims the benefit of U.S. Provisional Application No. 62/049,357 filed Sep. 11, 2014 and U.S. Provisional Application Ser. No. 62/073,689 filed Oct. 31, 2014, the contents of which are hereby incorporated by reference herein.

SUMMARY

To facilitate spatial sharing or reuse, signaling may be used in a wireless local area network (WLAN) system. A first node may receive one or more frame exchanges between a second node and a third node, wherein the second node is associate with the third node. The first node may then detect a spatial sharing scenario (SSS) with an overlapping basic service set (BSS) based on the received one or more frame exchanges. Also, the first node may transmit a directional poll request to at least a fourth node associated with the first node based on the detected SSS, and thereby null directional transmissions associated with the second node, the third node or both. The first node may then receive a direction poll response from the fourth node. Further, the first node may transmit one or more directional, beamformed transmissions to the fourth node simultaneously with directional, beamformed transmissions by the second node to the third node.

Also, a station (STA) may receive a wireless signal including a preamble of a packet. An energy level of the signal received may exceed a clear channel assessment (CCA) threshold. The STA may determine, using a carrier sense multiple access (CSMA) protocol, to ignore a payload portion of the packet based on information contained in the preamble and adjust the CCA threshold to account for the payload portion of the packet. The STA may then conduct CSMA wireless medium access during the payload portion of the packet using the adjusted CCA threshold. In an example, the STA may receive the preamble of the packet via a beamformed signal. In another example, the STA may receive the preamble of the packet via an omni-directional signal.

Further, signaling may be used for procedures of directional transmission from a first transmitter to a first receiver. If the first transmitter and first receiver want to allow their directional transmit opportunity (TXOP) to be spatially shared by other nodes, they may have an omni-directional spatial sharing frames exchange preceding their directional TXOP. The omni frames preceding the directional TXOP will indicate that the subsequent TXOP (and data frames with the TXOP) will be directional transmission.

BRIEF DESCRIPTION OF THE DRAWINGS

A more detailed understanding may be had from the following description, given by way of example in conjunction with the accompanying drawings wherein:

FIG. 15 is a diagram of an example of a method of continued back-off.

DETAILED DESCRIPTION

Figure 1A:
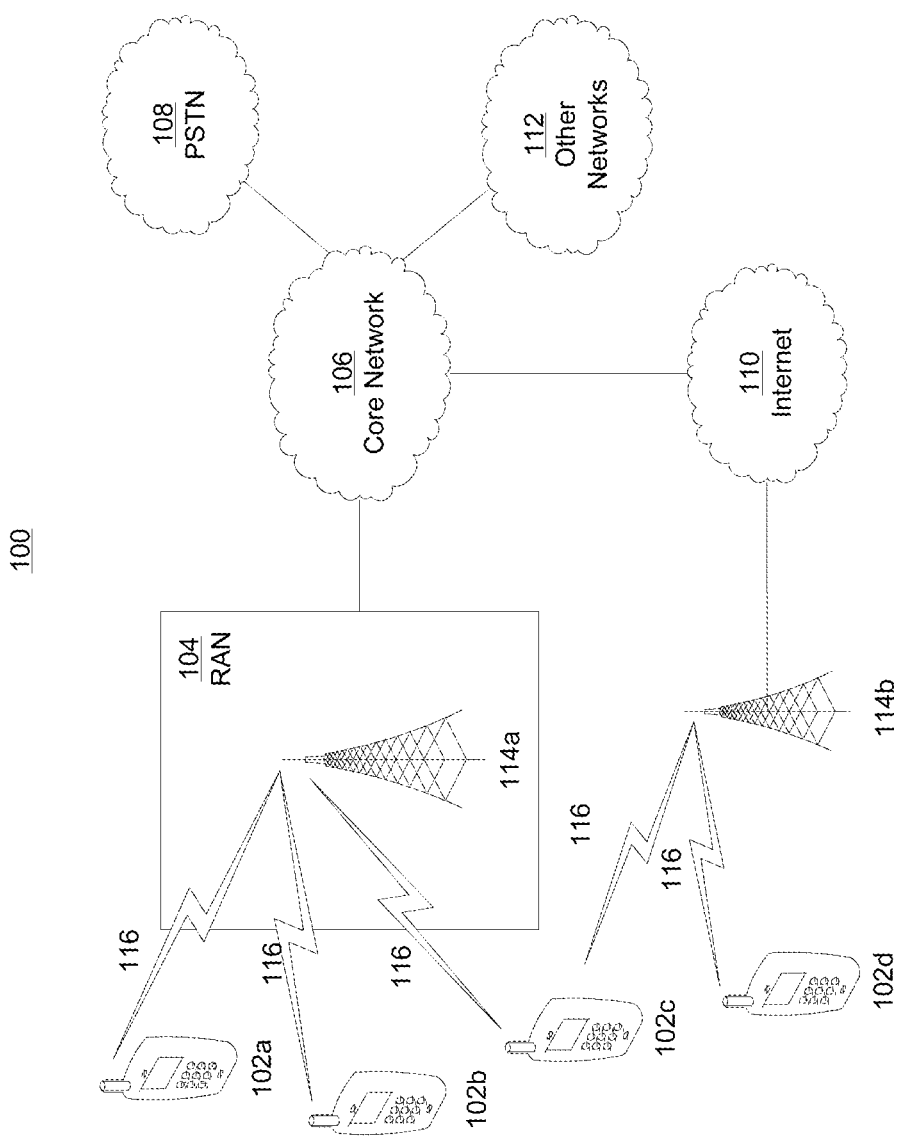
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
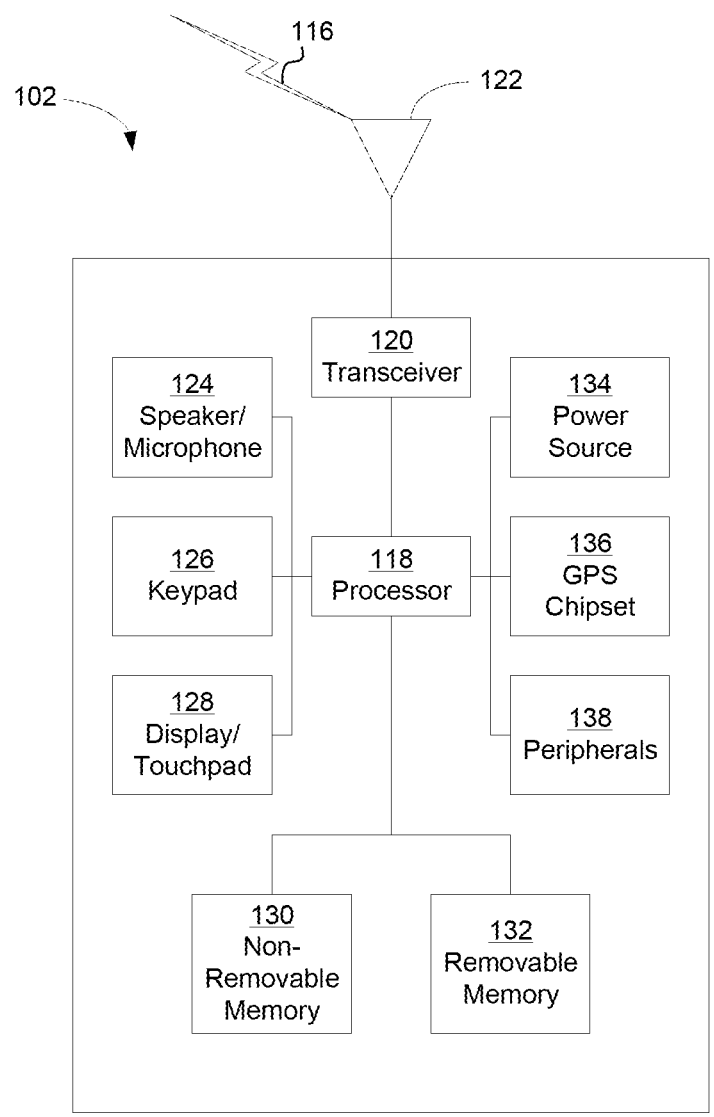
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
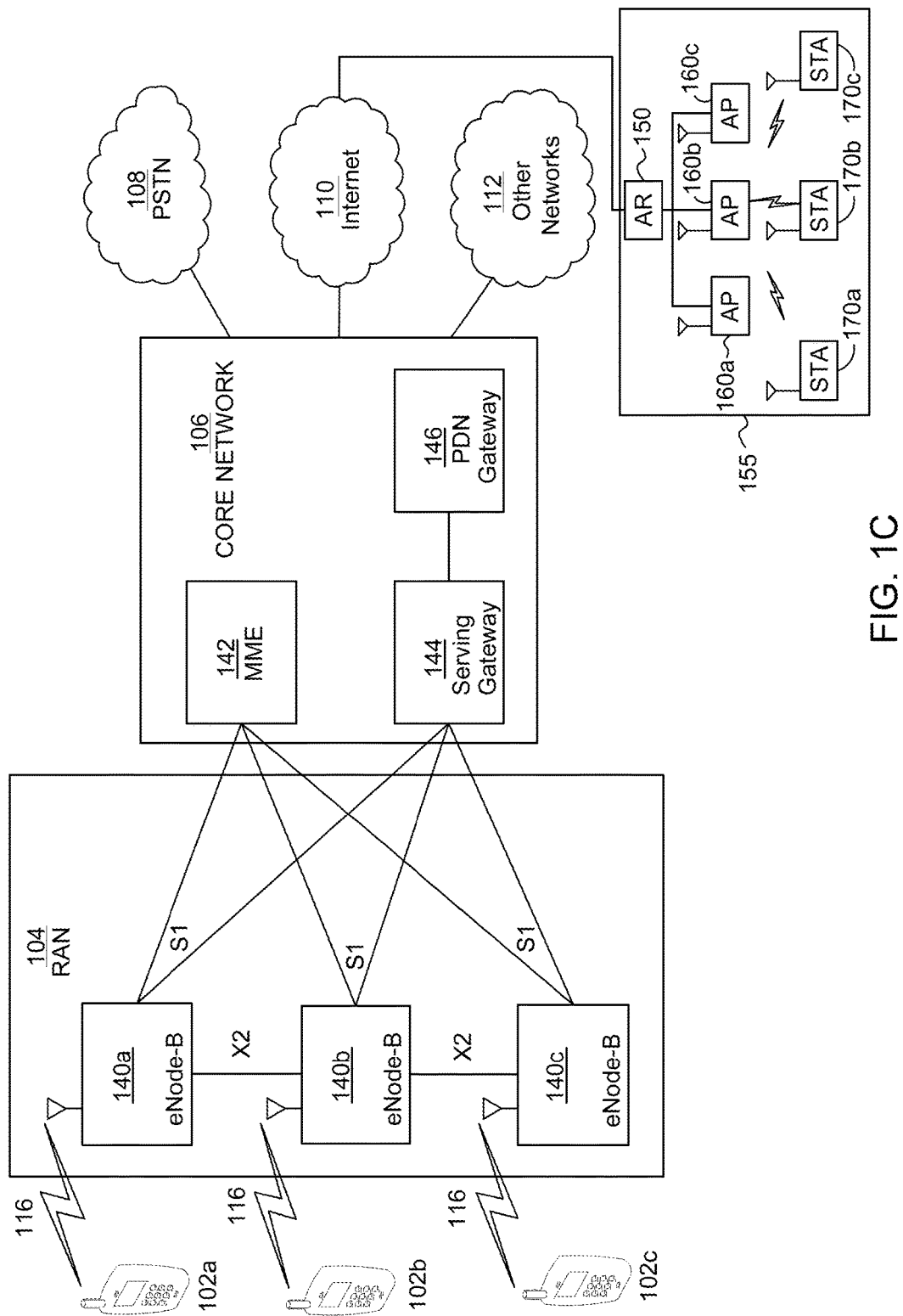
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a WLAN 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WLAN in Infrastructure basic service set (BSS) mode has an Access Point (AP) for the BSS and one or more stations STAs associated with the AP. The AP typically has access or an interface to a distribution system (DS), or another type of wired/wireless network that carries traffic in/out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP, wherein the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an IEEE 802.11e DLS or an IEEE 802.11z tunneled DLS (TDLS). A WLAN in Independent BSS mode has no AP and STAs communicate directly with each other.

Sectorized transmission has been discussed in IEEE 802.11ad. In unmodified IEEE 802.11ad, all STAs and APs are assumed to conduct sectorized beam transmissions. A beamformed TXOP may be reserved by transmitting beamformed request to send (RTS)/directional multi-gigabits (DMG) clear to send (CTS) frames. The STAs that receive the RTS/DMG CTS shall obey their network allocation vectors (NAVs). A recipient DMG STA which receives a valid RTS from the source STA during a Service Period (SP) may also transmit a DMG denial to send (DTS) to tell the source STA to postpone transmissions if one of the NAV timers at the recipient STA is non-zero.

A personal basic service set (PBSS) central point (PCP) may request a pair of STAs that intend to conduct directional transmissions to each other to conduct measurements while another pair of STAs is actively transmitting directionally; subsequently, the PCP may request that the second pair of STAs to conduct directional measurements while the first pair of STAs transmitting directionally to each other. If both pairs of STAs report no or little interference from each other's transmissions, the two pairs of STAs may be scheduled in the same Service Period (SP) to conduct concurrent directional transmissions.

New spectrum is being allocated in various countries around the world for wireless communication systems such as WLANs. Such spectrum is often quite limited in the size and also in the bandwidth of the channels they comprise. In addition the spectrum may be fragmented in that available channels may not be adjacent and may not be combined for larger bandwidth transmissions. Such is the case, for example, in spectrum allocated below 1 gigahertz (GHz) in various countries. WLAN systems, for example, built on the IEEE 802.11 Standard, may be designed to operate in such spectrum. Given the limitations of such spectrum, the WLAN systems will only be able to support smaller bandwidths and lower data rates compared to high throughput (HT)/very high throughput (VHT) WLAN systems, for example, based on the IEEE 802.11n/802.11ac Standards.

The IEEE 802.11ah Task Group (TG) has been established to develop solutions to support WiFi systems in the sub-1 GHz band. The IEEE 802.11ah TG is targeting to achieve the following requirements: orthogonal frequency-division multiplexing (OFDM) physical (PHY) layer operating below 1 GHz in license-exempt bands excluding television white space (TVWS); enhancements to medium access control (MAC) to support PHY, coexistence with other systems (e.g. IEEE 802.15.4 and P802.15.4g); and optimization of rate vs. range performance (range up to 1 km (outdoor) and data rates >100 Kbit/s). The following use cases have been adopted by the TG for IEEE 802.11ah: Use Case 1: Sensors and meters; Use Case 2: Backhaul Sensor and meter data and Use Case 3: Extended range Wi-Fi for Cellular offloading.

The spectrum allocation in some countries is quite limited. For example, in China the 470-566 and 614-787 megahertz (MHz) bands only allow 1 MHz bandwidth. Therefore, there will be a need to support a 1 MHz only option in addition to a support for a 2 MHz with 1 MHz mode also. The unmodified IEEE 802.11ah PHY is required to support 1, 2, 4, 8, and 16 MHz bandwidths.

The IEEE 802.11ah PHY operates below 1 GHz and is based on the IEEE 802.11ac PHY. To accommodate the narrow bandwidths required by IEEE 802.11ah, the IEEE 802.11ac PHY is down-clocked by a factor of 10. While support for 2, 4, 8, and 16 MHz can be achieved by the 1/10 down-clocking described above, support for the 1 MHz bandwidth may require a new PHY definition with an fast Fourier transform (FFT) size of 32.

In IEEE 802.11ah, a key use case defined is for meters and sensors, in which up to 6000 STAs should be supported within one single BSS. The devices such as smart meters and sensors have very different requirements pertaining to the supported uplink and downlink traffic. For example, sensors and meters could be configured to periodically upload their data to a server which will most likely be uplink traffic only. Sensors and meters can also be queried or configured by the server. When the server queries or configures a sensor or meter, it will expect that the queried data should arrive within a setup interval. Similarly, the server/application will expect a confirmation for any configuration performed within a certain interval. These types of traffic patterns seem to be very different than the traditional traffic patterns assumed for the WLAN systems.

In the IEEE 802.11ah signal (SIG) field of the physical layer convergence procedure (PLCP) preamble of a packet, 2 bits are used to indicate the type of acknowledgment expected as a response (e.g., an early acknowledgement (ACK) Indication) to the packet. The 2 bit ACK indication (00: ACK; 01: block acknowledgement (BA); 10: No ACK; 11: a frame that is not ACK, BA or CTS) is signaled in the SIG field.

The following views of sectorization operations have been discussed in IEEE 802.11ah. An IEEE 802.11ah AP may conduct sectorized transmissions, while an IEEE 802.11 non-AP may conduct omni-directional transmissions.

Sectorized Beam Operation may include Type 1 Sectorization. The AP in Type 1 Sectorization may both transmit and receive using omni- and sectorized beams. Further, the AP may switch back and forth between sectorized beam(s) and an omni-beam. Also, a sectorized beam may be used when an AP is aware of the STA's best sector or in a scheduled transmission such as a restricted access window (RAW) or during TXOP of a STA. AP switch back to an omni-beam otherwise. In addition, a sectorized transmit beam may be used in conjunction with the sectorized receive beam. Further, an AP may associate a STA with a specific group (e.g., same sector/group ID) based on the STA's best sector.

In an example of Sectorized Beam Operation, Four Spatially Orthogonal (SO) Conditions have been proposed for Type 1 Sectorized Operations. These SO Conditions may be referred to as SO Condition 1, SO Condition 2, SO Condition 3 and SO Condition 4.

Figure 2:
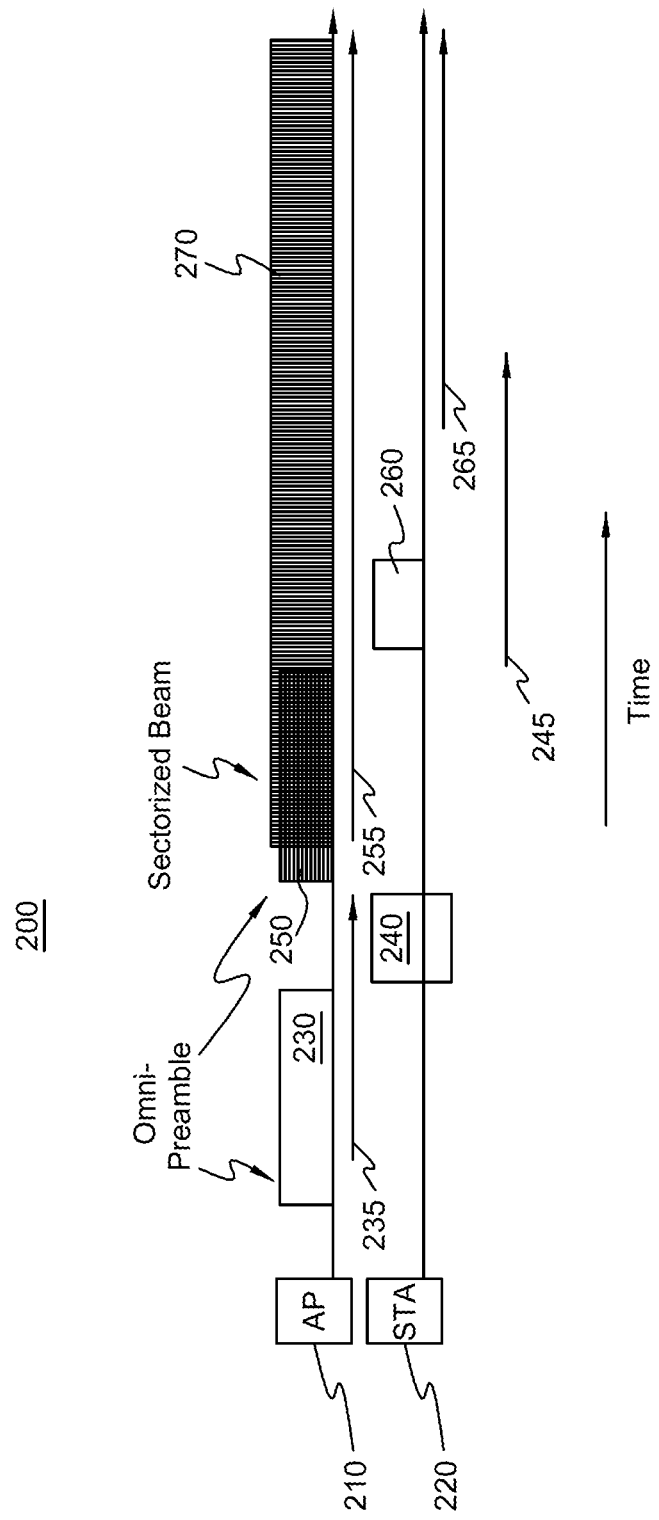
FIG. 2 is an diagram of an example of a Spatially Orthogonal (SO) Condition.

FIG. 2 is a diagram of an example of an SO Condition. The illustration of example TXOP protection 200 may be referred to as SO Condition 1. In an example, an AP 210 may use an omni frame to set up TXOP protection for a sectorized beam transmission 270. The omni-preamble may be included in an omni-packet 230 and included in the beginning of a long packet (or long frame) 250. Once the proper TXOP protection is set up with a long preamble, the sectorized transmission 270 (with greenfield beamforming (BF)) may be used for the remainder of the TXOP.

In an example, the SO condition may be confirmed by an overlapping BBS (OBSS) STA/AP (not shown) not receiving a transmission from STA 220 and a sectorized transmission from AP 210. For example, an OBSS STA may not receive a transmission from STA 220 when the OBSS STA expects a following STA 220 transmission when it sees Ack Ind=00, 10, Ack Ind=11/Ack Policy=00 in the Omni packet 230 of the omni-preamble of AP 210; and the OBSS STA may not receive from AP 210 a sectorized transmission portion within the long packet 250.

In a further example, STA 220 may transmit an ACK or response 240 after the AP transmits the omni packet 230. Also, the STA 220 may transmit an ACK 260 after the AP transmits the long packet 250. The STA 220 may set a NAV 265 after the STA 220 begins to transmit the ACK 260.

Further, the AP 210 may set a NAV 235 when the AP 210 begins to transmit the omni packet 230 and a NAV protected BF duration 255 after the AP 210 begins to transmit the long packet 250. An OBSS STA and/or OBSS AP (not shown) may then spatially re-use a channel 245.

Figure 3:
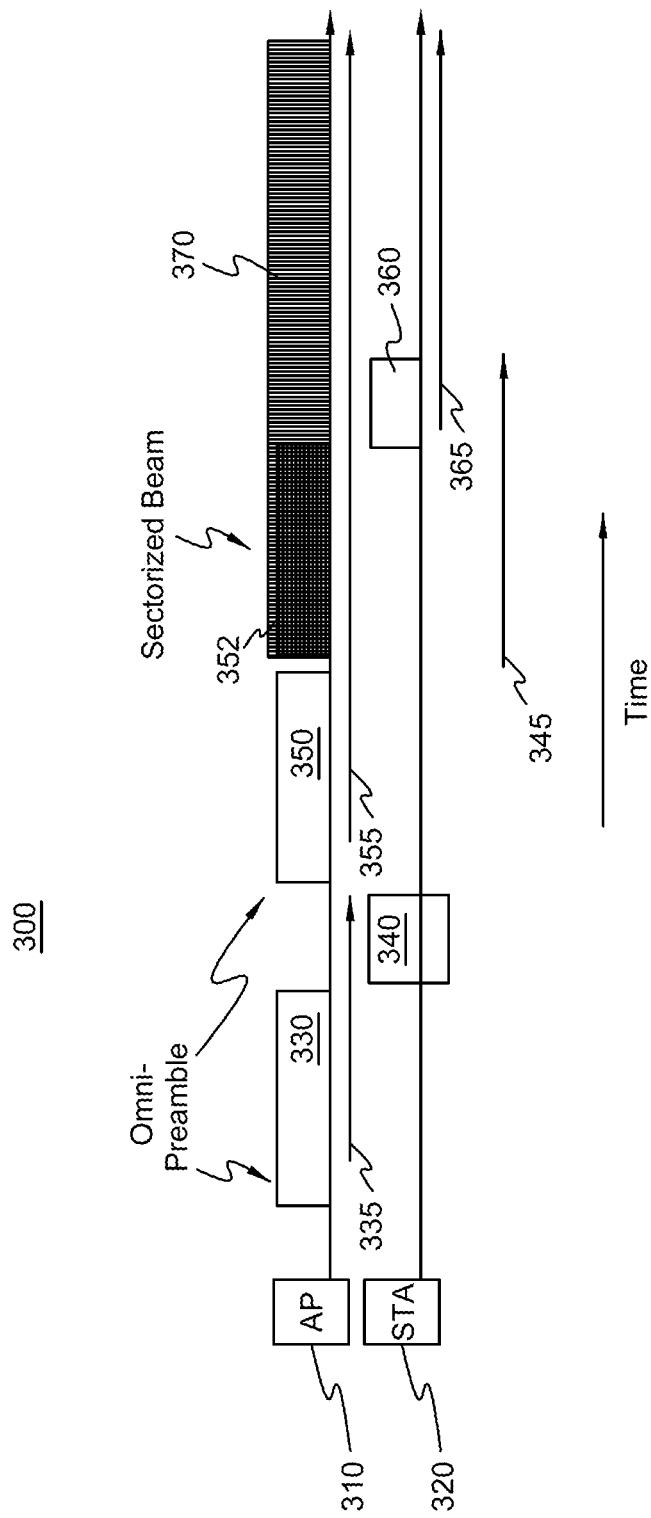
FIG. 3 is a diagram of another example of an SO Condition.

FIG. 3 is a diagram of another example of an SO Condition. The illustration of example TXOP protection 300 may be referred to as SO Condition 2. In an example, an AP 310 can use a short-preamble with omni-transmission to set up TXOP protection for a sectorized beam transmission 370. An omni-beam may include an omni-packet 330 and a short packet 350. As shown in the examples herein, the TXOP protection may be set up at the second transmission by an AP. Once the proper TXOP protection is set up, the sectorized transmission 370 (with greenfield BF) may be used for the remainder of the TXOP.

In an example, the SO condition may be confirmed by an OBSS STA/AP (not shown) not receiving a transmission from STA 320 and a sectorized transmission from AP 310. For example, an OBSS STA may not receive a transmission from STA 320 when the OBSS STA expects a following STA 320 transmission when it sees Ack Ind=00, 10, or Ack Ind=11/Ack Policy=00 in the Omni packet 330 of the omni-beam of AP 310; and the OBSS STA may not receive from AP 310 a sectorized transmission following the omni packet 330 with ACK Policy=Block Ack*.

In a further example, STA 320 may transmit an ACK or response 340 after the AP 310 transmits the omni packet 330. Also, the STA 320 may transmit an ACK or response 360 after the AP transmits the short packet 350 and short packet 352. The AP 310 may transmit with ACK Policy=BACK or NO ACK*. The STA 320 may set a NAV 365 after the STA 320 begins to transmit the ACK or response 360.

Further, the AP 310 may set a NAV 335 when the AP 310 begins to transmit the omni packet 330 and a NAV 355 after the AP 310 begins to transmit the short packet 350. An OBSS STA and/or OBSS AP (not shown) may then spatially re-use a channel 345.

Figure 4:
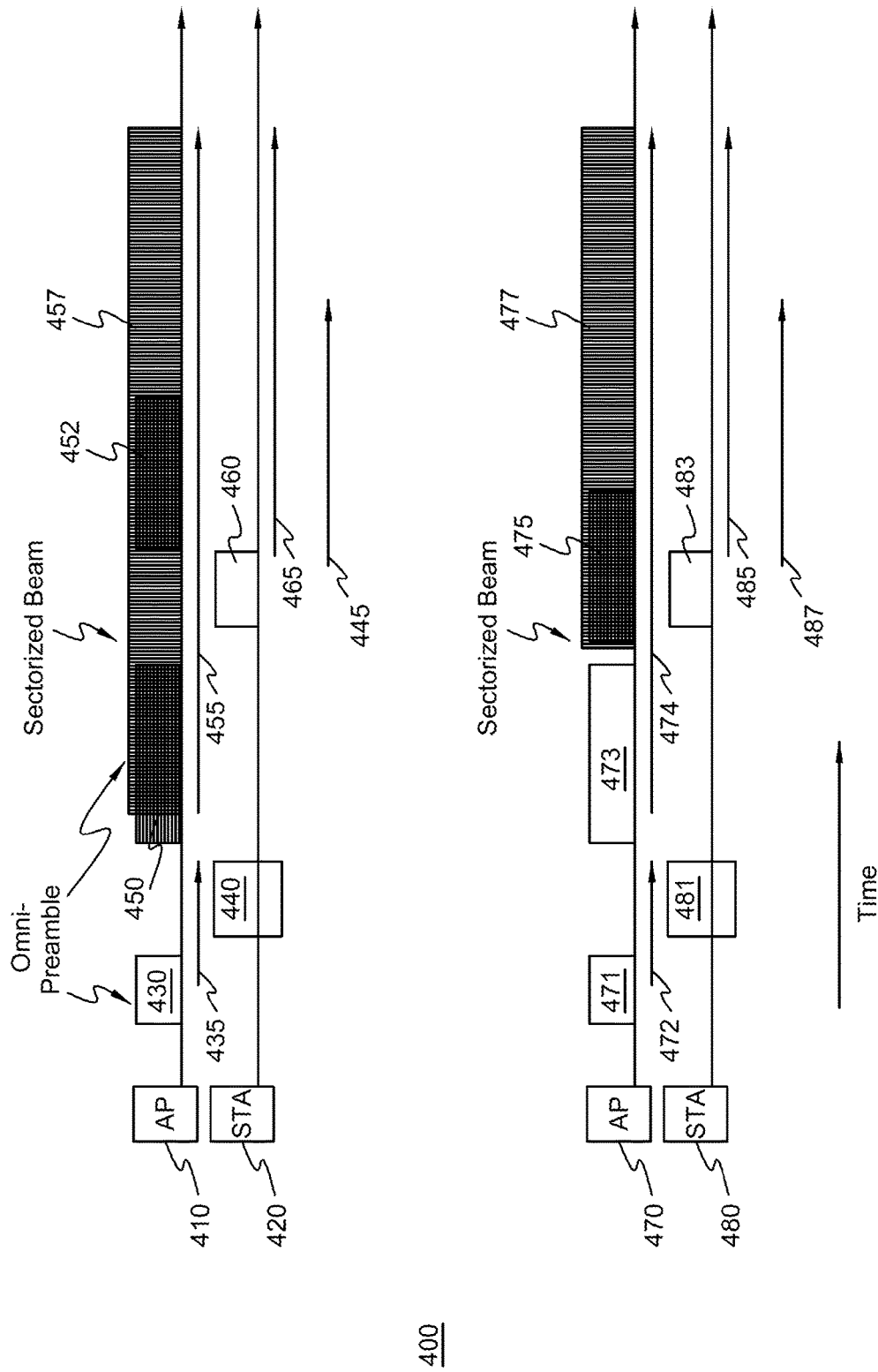
FIG. 4 is a diagram of a further example of an SO Condition.

FIG. 4 is a diagram of a further example of an SO Condition. The illustration of example TXOP protection 400 may be referred to as SO Condition 3. In an example, an AP 410 may start a frame exchange with an omni-RTS 430 to solicit a CTS response 440 from a STA 420 and then use the omni-transmission to set up protection for the duration of a sectorized beam transmission 457. An omni-preamble may include an omni-RTS 430 and a long omni-directional preamble 450. The AP 410 may then switch to the sectorized beam transmission 457 for the remainder of the protected duration, which may be a NAV protected BF formation 455. The sectorized transmission 457 may be preceded by the long omni-directional preamble 450. The sectorized transmission 457 may include a short preamble 452.

In a further example, STA 420 may transmit an ACK 460 after the AP 410 transmits the long preamble 450. The STA 420 may set a NAV 465 after the STA 420 begins to transmit the ACK 460.

Further, the AP 410 may set a NAV 435 when the AP 410 begins to transmit the omni-RTS 430 and a NAV 455 after the AP 410 begins to transmit the long omni-directional preamble 450. An OBSS STA and/or OBSS AP (not shown) may then spatially re-use a channel 445.

In another example, an AP 470 may start a frame exchange with an omni-RTS 471 to solicit a CTS response 481 from a STA 480 and then use the omni-transmission to set up the protection for the duration of a sectorized beam transmission 477. The AP 470 may then switch to the sectorized beam transmission 477 for the remainder of the protected duration, which may be a NAV protected BF formation 474. The sectorized transmission 477 may be preceded by a short omni-directional preamble 473. The sectorized transmission 477 may include a short packet 475.

In a further example, STA 480 may transmit an ACK 483 after the AP 470 transmits the short omni-directional preamble 473. The STA 480 may set a NAV 485 after the STA 480 begins to transmit the ACK 483.

Further, the AP 470 may transmit with ACK Policy=BACK or NO ACK*. Also, the AP 470 may set a NAV 472 when the AP 470 begins to transmit the omni-RTS 471 and a NAV 474 after the AP 470 begins to transmit the short omni-directional preamble 473. An OBSS STA and/or OBSS AP (not shown) may then spatially re-use a channel 487.

In an example, the SO condition may be confirmed by an OBSS STA or AP (not shown) which may observe the omni-transmission of AP 410 and/or AP 470 but not the beamformed transmission of the APs and not the transmissions of STA 420 and/or STA 480.

Figure 5:
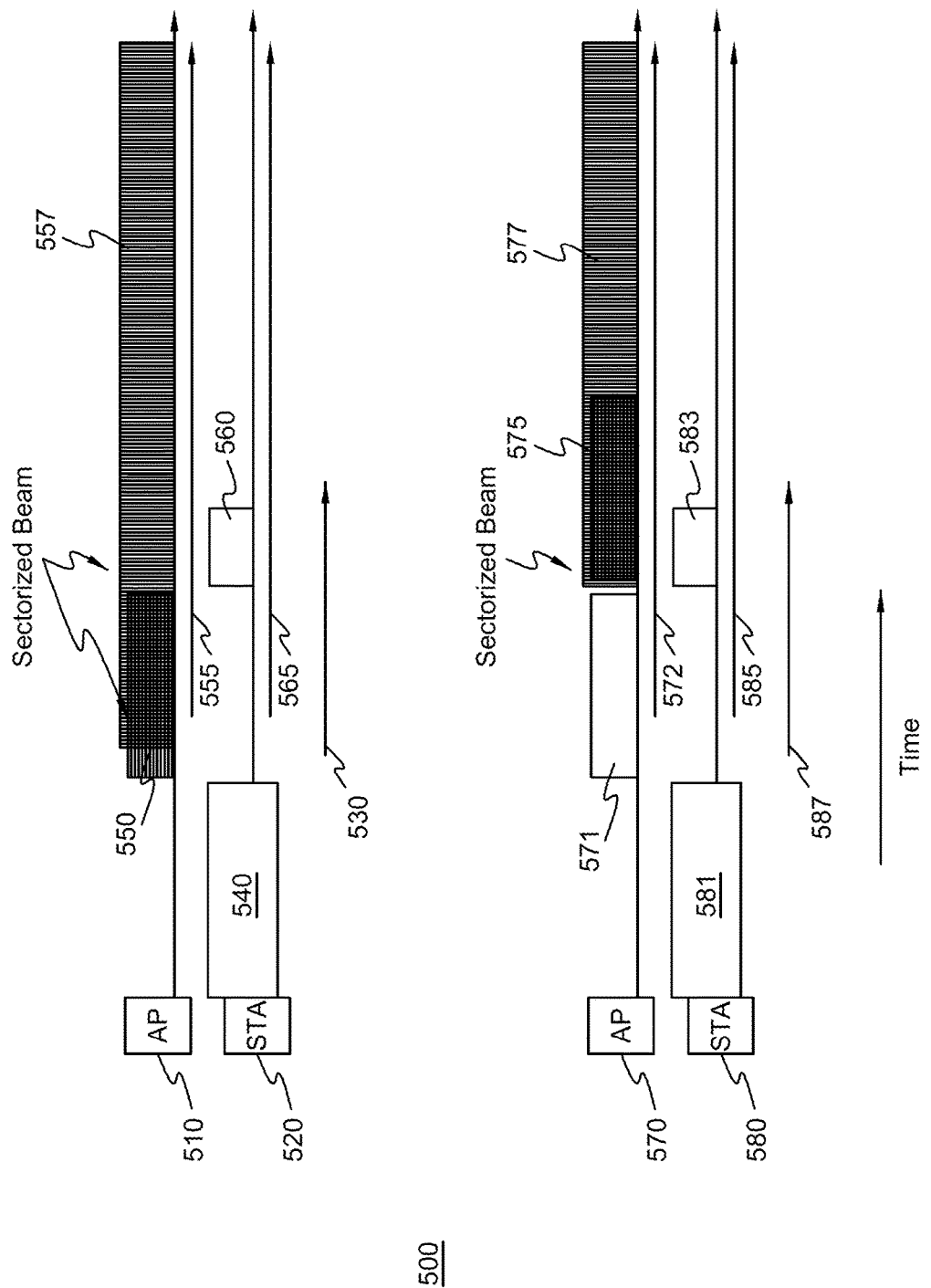
FIG. 5 is a diagram of an additional example of an SO Condition.

FIG. 5 is a diagram of an additional example of an SO Condition. The illustration of example TXOP protection 500 may be referred to as SO Condition 4. In an example, the TXOP protection may be set up by omni transmission for a duration within a TXOP and if the SO condition is confirmed by an OBSS STA/AP, the OBSS STA/AP may cancel its NAV to initiate a new SO exchange starting with a non-BF RTS/CTS. Once an AP switches to the sectorized beam transmission during an exchange, it may continue with greenfield sectorized beam transmission for the remainder of the protected duration. In examples disclosed herein, an SO condition may be defined as an OBSS STA/AP which receives the omni-transmission but not the sectorized transmission from the AP (which is either the TXOP holder or responder) and not the transmission from the STA (which is either the TXOP responder or holder).

In an example, a STA 520 may start a frame exchange with a PS-Poll/Trigger/Other Frame 540. An AP 510 may then transmit an omni-preamble to set up protection for the duration of a sectorized beam transmission 557. The omni-preamble may include a long packet (or long preamble) 550. The AP 510 may transmit the long packet 550 in response to the PS-Poll/Trigger/Other Frame 540. The AP 510 may switch to the sectorized beam transmission 557 for the remainder of the protected duration. The sectorized transmission 557 may be preceded by the long packet 550.

In a further example, STA 520 may transmit an ACK or response 560 after the AP 510 transmits the long packet 550. The STA 520 may set a NAV 565 after the STA 520 begins to transmit the ACK 560.

Further, the AP 510 may set a NAV 555 when the AP 510 begins to transmit the long packet 550. An OBSS STA and/or OBSS AP (not shown) may then spatially re-use a channel 530. In an example, the OBSS STA and/or OBSS AP (not shown) may then spatially re-use the channel 530 on a condition that the AP transmission, such as the long packet 550, can be identified as the response to the PS-Poll/Trigger/Other Frame 540.

In another example, a STA 580 may start a frame exchange with a PS-Poll/Trigger/Other Frame 581. An AP 570 may then transmit an omni-preamble to set up protection for the duration of a sectorized beam transmission 577. The omni-preamble may include a short packet (or short preamble) 571. The AP 510 may transmit the short packet 571 in response to the PS-Poll/Trigger/Other Frame 581. The AP 570 may switch to the sectorized beam transmission 577 for the remainder of the protected duration. The sectorized transmission 577 may be preceded by the short packet 550. The sectorized transmission 577 may include a short packet (or short preamble) 575.

In a further example, STA 580 may transmit an ACK or response 583 after the AP 570 transmits the short packet 571. The STA 580 may set a NAV 565. In an example, the STA 580 may set the NAV 565 before the STA 580 begins to transmit the ACK or response 583.

Further, the AP 470 may transmit with ACK Policy=BACK or NO ACK*. Also, the AP 570 may set a NAV 572 when the AP 570 begins to transmit the short packet 572. An OBSS STA and/or OBSS AP (not shown) may then spatially re-use a channel 587. In an example, the OBSS STA and/or OBSS AP (not shown) may then spatially re-use the channel 587 on a condition that the AP transmission, such as the short packet 572, can be identified as the response to the PS-Poll/Trigger/Other Frame 581.

Figure 6:
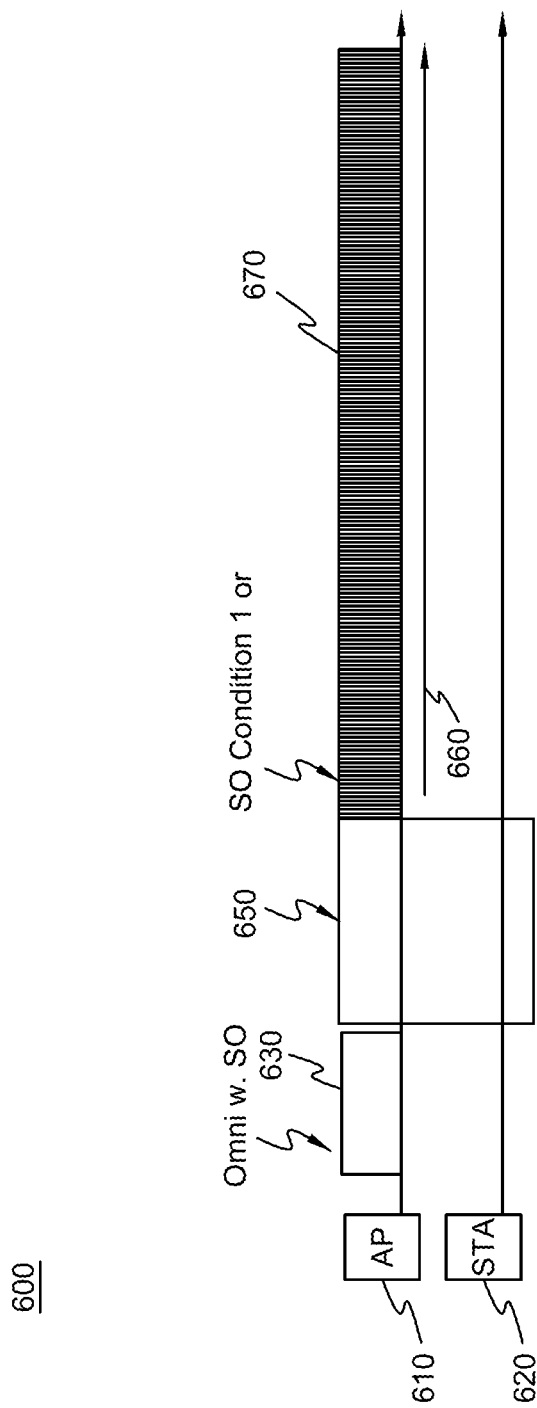
FIG. 6 is a diagram of an example of using clear to send (CTS)-to-self to facilitate the detection of the SO conditions.

FIG. 6 is a diagram of an example of using CTS-to-self to facilitate the detection of the SO conditions. In the illustration of example TXOP protection 600, with respect to sectorized beam operation, information elements may be used for Type 0 and Type 1 Sectorization. In an example, an AP 610 may transmit a CTS-to-self 630 as an omni-transmission with SO. The AP 610 may then transmit an omni-preamble 650 to set up protection for the duration of a sectorized beam transmission 670. The STA 620 may receive the omni-preamble 650. The AP 610 may switch to the sectorized beam transmission 670 for the remainder of the protected duration. In an example, the CTS-to-self 630 (which precedes SO conditions 1 or 2) may include a 1-bit sector ID indicator to facilitate the detection of the SO conditions. Further, the AP 610 may set a NAV 660 when the AP 610 begins the sectorized beam transmission 670.

In the current main stream unmodified WiFi standards (for example, IEEE 802.11n, IEEE 802.11ac and the like), spatial sharing is not supported (and may not be allowed) in an OBSS. Within an OBSS, only one TXOP is allowed. IEEE 802.11ax has a requirement for supporting dense deployment scenarios, higher area throughput, and substantially improved spectral efficiency. To support these requirements of IEEE 802.11ax, a more efficient mechanism to utilize the channel medium is required. Further, with the dense deployment scenarios and higher requirements on area throughputs and spectral efficiency in TGax, a more efficient mechanism to utilize the channel medium is required to achieve the goal.

Additionally, in the current unmodified IEEE 802.11ad standard, orthogonal beamforming between two pairs is allowed but only with a scheduled MAC. In the current unmodified IEEE 802.11ah standard, TXOP-based sectorization may be used to allow some spatial sharing/reuse, however it is limited to sectorization and supports only-AP initiated spatial reuse. The increased requirements for IEEE 802.11ax may be addressed by a more flexible, and comprehensive, mechanism for spatial sharing. Further, with the dense deployment scenarios, higher requirements on area throughputs and spectral efficiency, and diverse use cases (including peer to peer communications) in IEEE 802.11ax, a more flexible and comprehensive mechanism of spatial sharing is desirable for IEEE 802.11ax.

Figure 7:
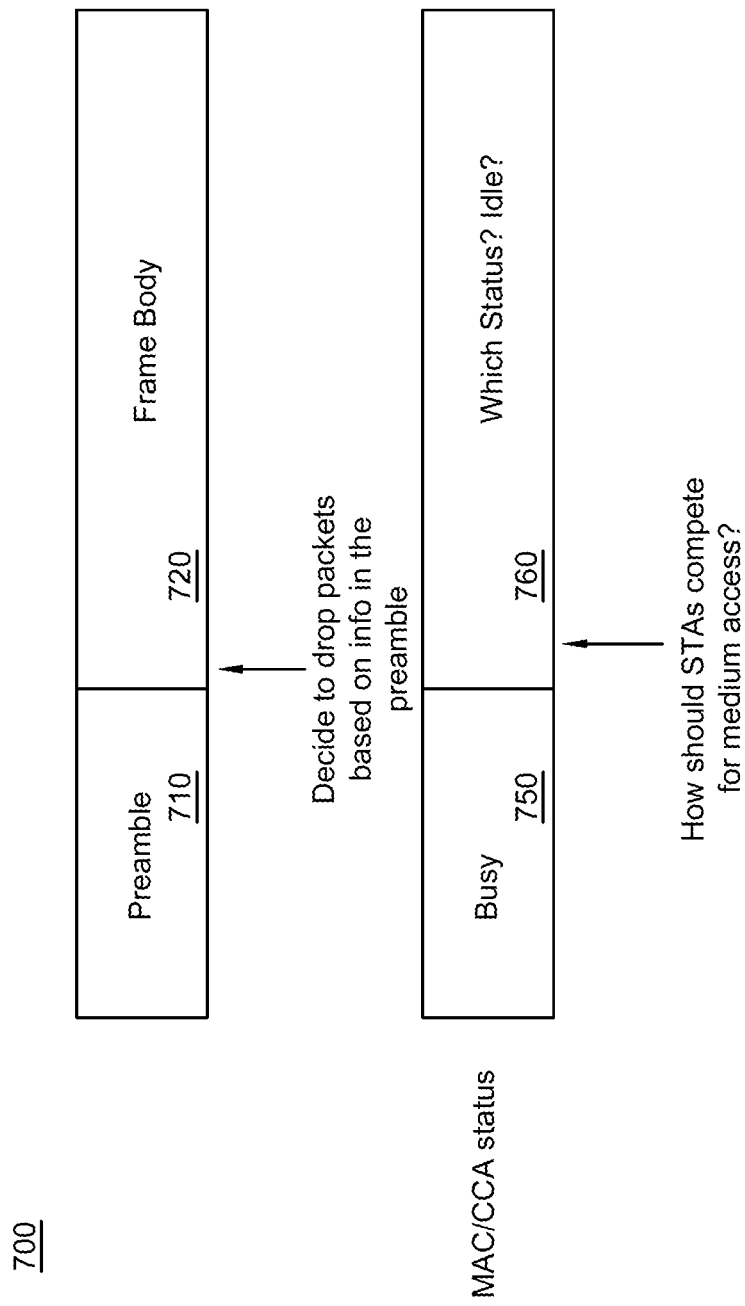
FIG. 7 is a diagram of an example of medium access when a station (STA) decides to drop a packet based on the received preamble or other indicators.

FIG. 7 is a diagram of an example of medium access when a STA decides to drop a packet based on the received preamble or other indicators. As shown in the illustration of the example of medium access 700, a problem may occur when a STA may decide to ignore a packet that it is currently receiving based on the information obtained from the preamble 710, and subsequently conduct normal medium access procedures (with references to color and clear channel assessment (CCA)). MAC and PHY procedures are needed to define MAC status transitions and to support correction medium access and packet receptions when a STA decides to ignore a packet based on the information currently received, such as information contained in the preamble 710. In an example procedure, the MAC/CCA status may be busy 750 during the preamble 710. A status 760, such as an idle status, may need to be determined during the frame body 720.

In order to facilitate more efficient spatial sharing or reuse in TGax system, the following signaling procedures may be used. In the following examples, directional transmission from a first transmitter to a first receiver are described.

If the first transmitter and first receiver want to allow their directional TXOP to be spatially shared by other nodes, they may have an omni-directional spatial sharing frames exchange preceding the operation using a directional TXOP.

The frames transmitted using an omni transmission preceding the directional TXOP may indicate that the subsequent TXOP (and data frames with the TXOP) will be a directional transmission. Also, as a protection of the directional transmission procedure, frame(s) transmitted using an omni-transmission preceding the directional TXOP procedure may indicate whether the directional TXOP procedure may be spatially shared by other nodes or not. The indication of an allowed subsequent directional TXOP and spatial sharing procedure for this TXOP may be implemented as an N-bit bitfield explicitly in any, or all, of the PLCP header, the MAC header or the framebody of the control and/or associated action frames. In another example, the indication of an allowed subsequent directional TXOP and spatial sharing procedure for this TXOP may be indicated by other methods, such as cyclic redundancy code (CRC) masking, scrambler initiation seeds values, a relative phase change in contiguous SIG fields or pilots (or pilot values and/or patterns), and/or signal patterns in the PLCP header.

As used herein, an omni-preamble may be used to describe the transmission of a preamble using an omni-transmission. Further, as used herein, a directional-preamble may be used to describe the transmission of a preamble using a directional transmission.

The omni-preamble and directional-preamble of the directional data frame may indicate that the rest of the data frames will be directional transmission. The first transmitter and first receiver may allow their directional TXOP to be spatially shared by other nodes.

The indication of the allowance for spatial sharing may be indicated in the directional frame, such as in the omni-preamble and directional-preamble of the directional frame, by setting a SpatialSharingAllow bit to 1. Such an indication may also imply that the presence of an omni-frames exchange procedure prior to the commencement of directional-transmissions.

The indication that directional transmission is taking place for the remainder of the frame, and that directional transmission and spatial sharing is allowed for this TXOP may be implemented as an N-bit bitfield explicitly in the PLCP header. In another example, the indication of an allowed subsequent directional TXOP and spatial sharing procedure for this TXOP may indicated by other methods, such as CRC masking, scrambler initiation seeds values, a relative phase change in contiguous SIG fields or pilots (or pilot values and/or patterns) and/or signal patterns in the PLCP header.

In order to protect the initial directional TXOP between the first transmitter and first receiver, the following example protection mechanisms for spatial sharing may be used. In an example, another node may attempt to spatially share the directional TXOP between the first transmitter and first receiver only if it receives either at least one omni-directional frame preceding the directional TXOP or the Omni-preamble in the directional frame(s) indicating spatial sharing is allowed, or at least one directional frame in the TXOP indicating spatial sharing is allowed.

In further example, if another node attempts to spatially share the directional TXOP between the first transmitter and first receiver, it may check the BSS Color in the PLCP preamble of the received omni-directional frame preceding the directional TXOP or the directional frames in the TXOP. If the BSS Color is the same BSS and the directional TXOP between the first transmitter and first receiver is between an AP and a non-AP STA, then the node may attempt to spatially share the directional TXOP. In this case, the transmission may be limited to peer-to-peer STA communications.

In another example, the received power level, or the CCA level, at the other node that is attempting to enable spatial sharing may be ensured to not exceed a threshold, which may be a pre-determined threshold. The threshold may be set statically in the standards or set semi-statically by the AP. Further, the value of the threshold may be different depending on the BSS color. For example, two different threshold values for spatial sharing may be used for the cases where the BSS Color in the PLCP preamble of the received omni-directional frame preceding the directional TXOP or the directional frames in the TXOP is the same BSS vs. different BSS. A higher threshold value for spatial sharing may be used for the case where the received BSS color indicates a different BSS.

Several spatial sharing example cases are identified herein. For the simplicity of illustration, a node that attempts to spatially share the directional TXOP between the first transmitter and first receiver may be referred to as a second transmitter herein. The potential spatial sharing case examples may be categorized according to whether the second transmitter can hear the first transmitter's omni- and directional transmissions and the first receiver's omni-transmissions. The following provide a description of example cases.

In an example case, which may be referred to as case 1, the second transmitter may be able to receive the omni-frame(s) (preceding the directional TXOP) transmitted by the first transmitter and first receiver, and the directional frame(s) within the TXOP. The received omni frames and/or directional frames indicate that the subsequent TXOP (and data frames with the TXOP) may be a directional transmission, and allow their directional TXOP to be spatially shared by other nodes. The second transmitter may infer that this is case 1 by observing a first omni-frame from the first transmitter and a second omni-frame from the first receiver, and then the omni-preamble of the subsequent directional frame from the first transmitter, and by observing the subsequent directional transmission from the first transmitter.

In another example case, which may be referred to as case 2, the second transmitter may be able to receive the omni-frame(s) (preceding the directional TXOP) transmitted by the first transmitter and first receiver, but not the directional frame(s) within the TXOP. The received omni-frames indicate that the subsequent TXOP (and data frames with the TXOP) may be a directional transmission, and allow their directional TXOP to be spatially shared by other nodes. The second transmitter may infer that this is case 2 by observing a first omni-frame from the first transmitter and a second omni-frame from the first receiver, and then the omni-preamble of the subsequent directional frame from the first transmitter, and by not observing the subsequent directional transmission from the first transmitter.

In a further example case, which may be referred to as case 3, the second transmitter may be able to receive the omni-frame(s) (preceding the directional TXOP) transmitted by the first receiver and the directional frame(s) within the TXOP, but not the omni-frame (preceding the directional TXOP) transmitted by first transmitter. The received omni-frame(s) and/or directional frame(s) indicates that the subsequent TXOP (and data frames with the TXOP) may be a directional transmission, and allow their directional TXOP to be spatially shared by other nodes. The second transmitter may infer that this is case 3 by not observing a first omni-frame from the first transmitter, observing a second omni-frame from the first receiver and the omni-preamble of the subsequent directional frame from the first transmitter, and observing the subsequent directional transmission from the first transmitter.

In an additional example case, which may be referred to as case 4, the second transmitter may be able to receive the omni-frame(s) (preceding the directional TXOP) and the omni-preamble of the subsequent directional frame transmitted by the first transmitter, but not the omni-frame (preceding the directional TXOP) transmitted by the first receiver and the directional frame(s) within the TXOP. The received omni frame(s) and/or omni-preamble of the directional frame(s) indicates that the subsequent TXOP (and data frames with the TXOP) may be a directional transmission, and allow their directional TXOP to be spatially shared by other nodes. The second transmitter may infer that this is case 4 by observing a first omni-frame and the omni-preamble of the subsequent directional frame from the first transmitter, by not observing the subsequent directional transmission from the first transmitter, and by not observing a second omni-frame from the first receiver. In other words, observing a gap of transmission between the first omni-frame and the omni-preamble of the subsequent directional frame from the first transmitter.

In yet another example case, which may be referred to as case 5, the second transmitter may be able to receive the directional frame(s) within the TXOP, but not the omni-frames (preceding the directional TXOP) transmitted by the first transmitter and first receiver. The received directional frame(s) indicates that the subsequent TXOP (and data frames with the TXOP) may be a directional transmission, and allow their directional TXOP to be spatially shared by other nodes. The second transmitter may infer that this is case 5 by not observing a first omni frame and the omni-preamble of the subsequent directional frame from the first transmitter, and a second omni frame from the first receiver, and by observing the subsequent directional transmission from the first transmitter. The identification of spatial sharing case may be used by the second transmitter in the procedure of spatial sharing in further examples described herein.

Several signaling examples and example procedures for spatial sharing are described herein. Examples of spatial sharing exchange mechanisms are described herein. In an example, a first transmitter and a first receiver may begin their TXOP of directional transmission: omni-frames exchange followed by directional transmission in the TXOP. Any second transmitter that wants to spatially share/reuse the directional TXOP between the first transmitter and first receiver may monitor the channel and decide whether the observed signals meet the criteria of one of the spatial sharing cases defined above. Upon identifying that this is a potential spatial sharing case, the second transmitter may transmit a spatial sharing request (for example, SS-Req) frame to a STA, or multiple STAs. The STAs which receive the SS-Req frame from the second transmitter may reply with a spatial sharing response (for example, SS-Resp) frame indicating that receiver-side spatial sharing conditions are met and communication between the second transmitter and receiver may begin. The names of spatial sharing request (for example, SS-Req) and spatial sharing response (for example, SS-Resp) frames may be generic, and interchangeable with frames pairs such as RTS and CTS, or Poll and Poll-Response frames. In this example, methods and mechanisms which enable the spatial sharing exchange between the second transmitter and receiver are described. The second transmitter may perform backoff a certain interframe space away upon the time it detects and determines spatial sharing conditions are met for a potential spatial sharing case.

Examples of receiver spatial sharing conditions are described herein. In an example, the STAs which successfully receive the SS-Req frame may check spatial sharing condition as a potential second receiver. The receiver-side spatial sharing conditions may be different depending on the directional-transmission capability of the STA. If the potential second receiver did not receive any omni or directional transmission from the first transmitter and/or first receiver, then it may be considered that receiver-side spatial sharing condition for omni-direction reply is met. The potential second receiver may reply with an SS-Resp frame using an omni-transmission regardless of its capability of directional transmitting or receiving. If the potential second receiver received any omni or directional transmission from the first transmitter and/or first receiver but it does not have the capability of directional transmitting or receiving, it will not reply any SS-Resp frame. If the potential second receiver received any omni or directional transmission from the first transmitter and/or first receiver and it has the capability of directional transmitting or receiving, the STA may need to determine whether it is able to perform a directional transmission on which it may null the direction of any received signals from the first transmitter and/or first receiver and at the same time make the transmission to the second transmitter successful. If so, the STA may reply with an SS-Resp frame in the appropriately chosen direction. Otherwise (where the spatial sharing condition is not met for the potential second receiver), it may not reply with any SS-Resp frame.

Examples of spatial sharing exchange procedures are described herein. Further, examples of spatial sharing exchange with unicast transmissions are described herein. In an example, the second transmitter may begin spatial sharing exchange with a STA in a unicast way. If the second transmitter does not receive any SS-Resp frame from the desired STA, or the SS-Resp frame from the STA is not decodable, the second transmitter may wait a certain interframe space (for example, xIFS), and choose another STA again. The second transmitter may repeat the above mentioned procedure until it successfully receives an SS-Resp frame from the desired STA or the remaining TXOP duration of the first transmission may not allow a spatial sharing transmission.

Table 1 provides an exemplary request frame, which may be referred to as an SS-Req frame. The spatial sharing request frame (for example, SS-Req) may be defined as in Table 1. One reserved Subtype value in the Frame Control field may be used to indicate the SS-Req frame type. The duration field may be limited by the duration of the first transmission of spatial sharing. For example, the duration field may be less than the remaining TXOP duration from the first transmission.

TABLE 1

| Frame Control | Duration | RA | TA | FCS |
|---|---|---|---|---|

In another example method, the second transmitter may carry more information than a simple request. For example the second transmitter may include the spatial sharing case in the SS-Req, whether the immediate ACK or delayed ACK is expected for the communications between the second pair. It may request more information such as link adaptation information, channel state information (CSI), preferred direction ID, etc. In this case, the SS-Req frame may be designed as in Table 2. Table 2 provides another exemplary request frame, which may be referred to as an SS-Req frame.

TABLE 2

| Frame Control | Duration | RA | TA | SS-Req Control | SS-Req Information | FCS |
|---|---|---|---|---|---|---|

An SS-Req Control field may carry some or all of the following information: Spatial sharing case ID (which may or may not be an optional field); ACK policy for the second transmission in spatial sharing case; and/or traffic identifier (TID) for the second transmission in spatial sharing case.

SS-Req Information field may carry some or all of the following information. The field may carry an modulation and coding scheme (MCS) request. The second transmitter may use this to ask the receiver to report the preferred MCS level. The field may also carry a transmit power/link margin report request. The second transmitter may use this to ask the receiver to reply with transmit power and link margin used for the response frame. In addition, the field may carry a CSI request. The second transmitter may use this to ask the receiver to feedback the channel state information measured at receiver side. Further, the field may carry a preferred sector/direction ID request. The second transmitter may use this to ask the receiver report the preferred sector or direction ID.

In another example method, the SS-Req frame may utilize a field which includes all these information fields mentioned herein. One way may be to reuse the HT field defined in the current unmodified IEEE 802.11, which may include an HT variant and a VHT variant. Both variants may be used to convey link adaptation and CSI information. Or a new variant, such as a high efficiency WLAN (HEW) variant, may be defined to carry this information.

In a further example method, a null data packet (NDP) SS-Req frame may be utilized. The NDP SS-Req frame may contain a PHY header only and may have no MAC body included. The SIG field of the PHY header may include NDP MAC frame type field, NDP MAC frame type may indicate this is an NDP SS-Req frame. Table 3 provides an exemplary request frame, which may be referred to as an SS-Req frame and specifically as an NDP SS-Req frame.

TABLE 3

| NDP MAC frame type | RA | TA | SS-Req Control | SS-Req Information |
|---|---|---|---|---|

If the STA successfully receives the SS-Req frame, and the receiver spatial sharing condition has been met, the STA may reply with an SS-Resp frame.

In one method, the SS-Resp frame may be simply indicating that the potential second receiver meets the spatial sharing condition, and ready for the spatial sharing communication. Thus, the SS-Resp frame may use the example design shown in Table 4. One reserved Subtype value in the Frame Control field may be used to indicate the SS-Resp frame. The duration value may be the value obtained from the Duration field of the immediately previous SS-Req frame, minus the time, in microseconds, required to transmit the SS-Resp frame and its short interframe space (SIFS) interval.

TABLE 4

| Frame Control | Duration | RA | TA | FCS |
|---|---|---|---|---|

In yet another example method, the second transmitter may request more information in an SS-Req frame. The SS-Resp frame may include information requested in the SS-Req frame, such as link adaptation information, CSI, preferred direction ID, etc. In this case, the SS-Resp frame may be designed as shown in Table 5.

TABLE 5

| Frame Control | RA | TA | SS-Resp Information | FCS |
|---|---|---|---|---|

The SS-Resp Information field may carry some or all of the following information. The field may carry a preferred MCS. The potential second receiver may use this field to report the preferred MCS level. The field may also carry a transmit power/link margin. The potential second receiver may use this field to report transmit power and link margin used for the response frame. Further, the field may carry CSI. The potential second receiver may use this field to feedback the channel state information measured at the receiver side. Different formats of CSI feedback may be utilized herein. In addition, the filed may carry a preferred sector/direction ID. The potential second receiver may use this field to report the preferred sector or direction ID.

In still another example method, the SS-Req frame may reuse the HT field defined in current unmodified IEEE 802.11, which includes HT variant and VHT variant. Both variants may be used to convey link adaptation and CSI information. Or a new variant, such as a HEW variant, may be defined to carry this information. The SS-Resp frame may use the same format too.

In yet a further example method, an NDP SS-Resp frame may be utilized. The NDP SS-Resp frame may contain a PHY header only and no MAC framebody included. The SIG field of the PHY header may be designed as shown in Table 6. An NDP MAC frame type may indicate this is an NDP SS-Req frame. An RA and a TA field may use a partial association identifier (AID) of the transmitter and receiver. The optional information field may contain information such as MCS, CSI, transmit power control (TPC), section/direction ID, etc.

TABLE 6

| NDP MAC frame type | RA | TA | Optional Information |
| --- | --- | --- | --- |

Examples of spatial sharing exchange with multicast transmissions are described herein. The second transmitter may begin spatial sharing exchange in a multicast way. The second transmitter may transmit the SS-Req frame to a group of users. In order to signal a group of user, the second transmitter may use example methods, which may be referred to as methods 1 and 2, described herein.

An example method of using a group ID mechanism is described herein. This example method may be referred to as Method 1. The second transmitter may reuse the existing groups. For example, the uplink (UL) multi-user (MU)-MIMO group, or UL OFDMA group, etc. Or the AP may have defined spatial sharing groups. The group ID may be carried in the SIG field of the PHY header. The MAC frame format of non-NDP SS-Req frame may reuse the same frame format as in as is used with unicast as long as it has the group related fields in this PHY header. The NDP SS-Req frame may need to add group related fields, such as Group Type and Group ID fields in their PHY header. For example, NDP SS-Req frame may use the design shown in Table 7. Table 7 provides an exemplary NDP SS-Req frame design with multicast transmissions.

TABLE 7

| NDP MAC frame type | Color bit | Group Type | Group ID | Optional SS-Req information |
| --- | --- | --- | --- | --- |

The STAs within the group may reply with the SS-Resp frame using a position array corresponding with the group ID. If a UL OFDMA group is utilized, the response frames from STAs may use the UL OFDMA format, and each STA may check the position array, and transmit on its assigned sub-channel. If a UL MU-MIMO group is utilized, the STAs may transmit SS-Resp frame in an UL MU-MIMO format, and they may be separated in spatial domain. If the spatial sharing group is utilized, the STAs may transmit SS-Resp frame with time/frequency/spatial domain separation. The MAC frame format of non-NDP SS-Resp frame may reuse the same frame format as is used with unicast as long as it has the Group related fields in this PHY header. The NDP SS-Resp frame may need to add group related fields, such as Group Type and Group ID fields in their PHY header. For example, NDP SS-Resp may use the design shown in Table 8. The MAC frame format of non-NDP SS-Resp frame may reuse the same frame format as is used with unicast as long as it has the Group related fields in this PHY header. The NDP SS-Resp frame may need to add group related fields, such as Group Type and Group ID fields in their PHY header. For example, NDP SS-Resp may use the design shown in Table 8. Table 8 provides an exemplary NDP SS-Resp frame design with multicast transmissions.

TABLE 8

| NDP MAC frame type | Color bit | Group Type | Group ID | Optional SS-Resp information |
| --- | --- | --- | --- | --- |

An example method of using multiple AIDs or a broadcast frame to transmit an SS-Req frame is described herein. This example method may be referred to as Method 2. In this method, the second transmitter may use multiple AIDs of STAs of interest in the MAC header or the framebody to multicast the SS-Req frame. Alternatively, the second transmitter may set the RA field in the SS-Req frame to the Broadcast address to broadcast the SS-Req frame. With this method being used, it is possible that multiple STAs may meet the spatial sharing condition, and intend to transmit SS-Resp frame to the second transmitter. The STAs may need to access the channel medium using a carrier sense multiple access with collision avoidance (CSMA/CA) scheme.

Figure 8:
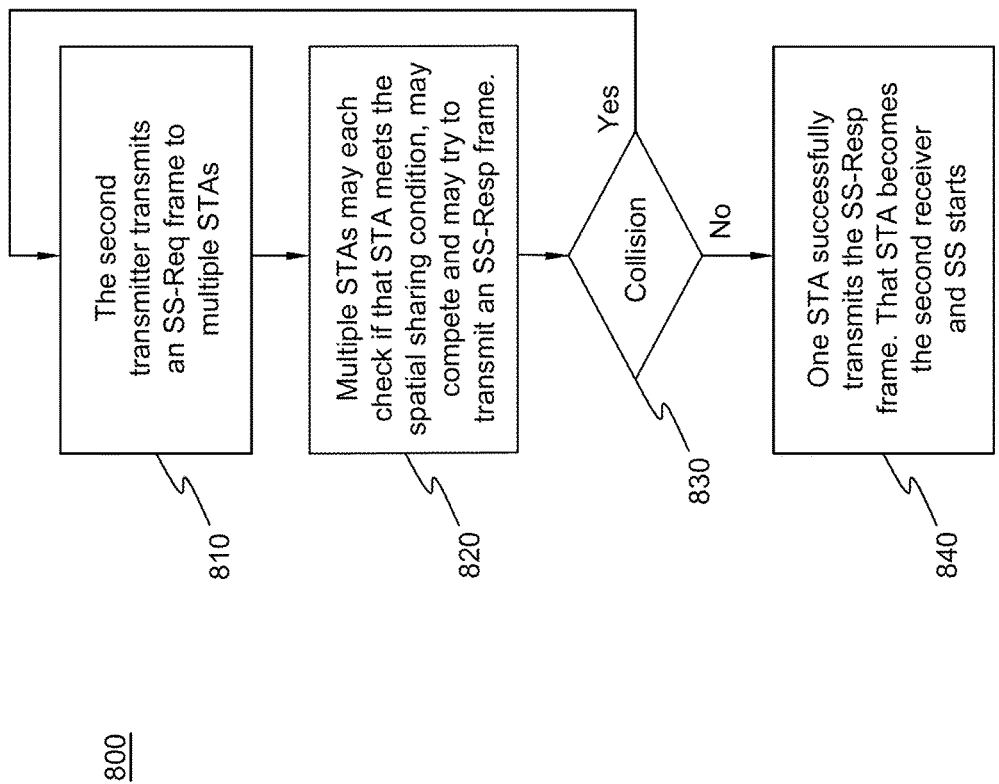
FIG. 8 is a diagram of example procedures of a spatial sharing exchange with multicast/broadcast transmission.

FIG. 8 is a diagram of example procedures of a spatial sharing exchange with multicast/broadcast transmission. As shown in procedure 800, a second transmitter may transmit an SS-Req frame to multiple STAs 810. The multiple STAs may check if they meet the spatial sharing condition. The multiple STAs may then compete and the winner may gain the access to the channel medium to transmit its SS-Resp frame 820. For example, each STA that receives the SS-Req may check if it meets the spatial sharing condition. Each STA that meets the spatial sharing condition may compete to gain the access to the channel medium to transmit its SS-Resp frame. If collision happens 830, the SS exchange may fail, and the transmitter may check the TXOP duration and restart a new spatial sharing exchange. If collision does not happen 840, then the one winning STA may successfully transmit the SS-Resp frame. Another STA or an AP may accordingly receive the SS-Resp frame from the winning STA. That winning STA may become the second receiver and the spatial sharing may start 840.

The STAs may perform spatial sharing exchange backoff. This backoff may be independent from any other backoff functions. In order to raise the priority of the SS exchange, the STAs may wait x interframe space(s) (xIFS) after confirming of SS condition, and begin the SS backoff.

In an alternative method, the second transmitter may reserve N several time slots for the SS-Resp. Each STA which meets the SS condition may randomly select a number k between 0 and N−1, and then transmit a SS-Resp frame on the k+1$^{th}$ time slot. The STA which successfully transmits SS-Resp in the earliest time slot may win the contention. Other rules to select the winning STA may apply.

In a third alternative method, instead of reserving N time slots, the transmitter may define N sub-channel(s), and STAs may compete on the sub-channel in a similar way.

Upon identification of a potential spatial sharing case as described herein, the second transmitter may choose a second receiver to spatially share the TXOP between the first transmitter and first receiver, and make sure its transmission to the second receiver may not interfere with the TXOP between the first transmitter and first receiver. In example described herein, each STA may be an AP or a non-AP STA.

Figure 9:
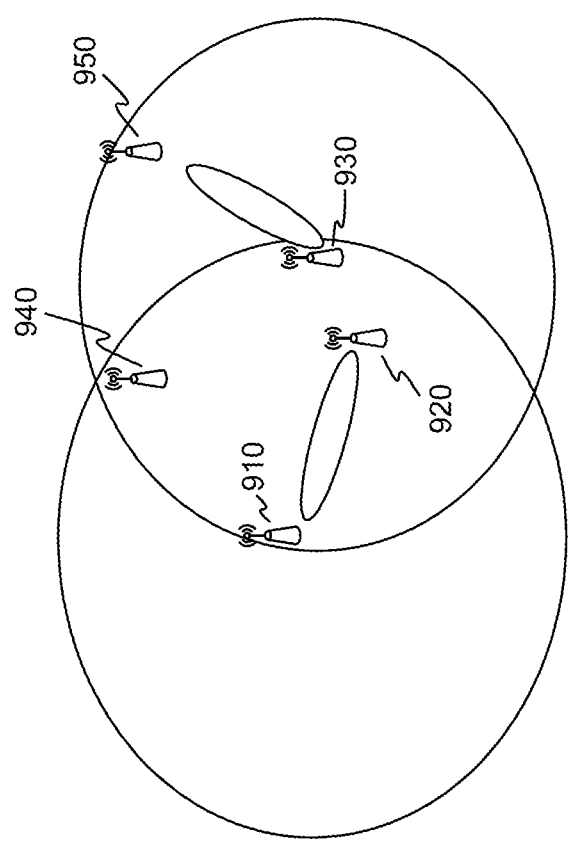
FIG. 9 is a diagram of an example of spatial sharing.

FIG. 9 is a diagram of an example of spatial sharing. As shown in diagram 900, in an example, which may be referred to as Spatial Sharing Case 1, a second transmitter 930 (for example, a STA3) may receive an omni-transmission of a first transmitter 910 (for example, a STA1) and first receiver 920 (for example, a STA2), and a directional-transmission from the first transmitter 910 to the first receiver 920.

In an example method, which may be referred to as Method 1, a second transmitter 930 may null the direction of the first receiver 920 in all its transmissions to a second receiver. A second transmitter will use the spatial sharing exchange procedures described herein to choose a second receiver. Considering an example as depicted in FIG. 9 for the purpose of illustration, where each STA can be an AP or non-AP STA. STA 1 (910) may be the first transmitter, STA 2 (920) may be the first receiver, and STA 3 (930) may be the second transmitter. Upon detecting that this is spatial sharing case 1, STA 3 (930) may send a directional SS-Req frame, which nulls the direction of STA2 (920). If a potential second receiver STA does not have the capability of directional transmission and reception, then it may transmit only an omni-directional SS-Resp frame responding to the STA3's (930) directional SS-Req frame. In this case, such a STA may respond with a SS-Resp frame only if it did not hear any omni-directional or directional transmission from STA1 (910) and STA2 (920). For example, STA5 (950) may respond to STA3 (930) but STA4 (940) may not. If a potential second receiver STA has the capability of directional transmission and reception, then it may transmit a directional SS-Resp frame responding to the STA3's (930) directional SS-Req frame if the receiver-side spatial sharing conditions as described above are met.

After a successful spatial sharing exchange, an appropriate second receiver may be chosen for the purpose of spatial sharing of the TXOP between the first transmitter and first receiver. Then, the second transmitter may send a directional frame to the second receiver without interfering with the directional transmission from the first transmitter to the first receiver. One example method to implement the directional transmission may be for the second transmitter to beamform to the direction of the second receiver and also null in the direction of the first receiver at the same time.

The second transmitter may terminate its transmission to the second receiver before the directional frame from the first transmitter to the first receiver is finished (e.g., before the first receiver transmits ACK back to the first transmitter). The second receiver may be required to postpone its ACK frame corresponding to the data frame transmitted from the second transmitter until the TXOP between first transmitter and first receiver is finished. A Postponed Block ACK scheme may be used in this case, for example.

In an example method, which may be referred to as Method 2, a second transmitter may null the direction of the first receiver, first transmitter and direction of the first transmitter's directional transmission/reception in all its transmissions to a second receiver. A second transmitter may use the spatial sharing exchange procedures described above to choose a second receiver. Considering an example as depicted in FIG. 9 for the purpose of illustration, where each STA can be an AP or non-AP STA, STA 1 (910) may be the first transmitter, STA 2 (920) may be the first receiver, and STA 3 (9300 may be the second transmitter.

Upon detecting that this is spatial sharing case 1, STA 3 (930) may send a directional SS-Req frame, which may null the direction of STA1 (910), the direction of STA2 (920) and directional transmission(s) from STA1 (910) to STA2 (920). If a potential second receiver STA does not have the capability of directional transmission and reception, then it may transmit only an omni-directional SS-Resp frame responding to STA3's (930) directional SS-Req frame. In this case, such a STA may respond with a SS-Resp frame only if it did not hear any omni-direction and directional transmission from STA1 (910) and STA2 (920). For example, STA5 (950) may respond but STA4 (940) may not. If a potential second receiver STA has the capability of directional transmission and reception, then it may transmit a directional SS-Resp frame responding to the STA3's (930) directional SS-Req frame if the receiver-side spatial sharing conditions described herein are met.

After successful spatial sharing exchange, an appropriate second receiver may be chosen for the purpose of spatial sharing of the TXOP between the first transmitter and first receiver. Then, the second transmitter may send a directional frame to the second receiver without interfering with the TXOP between the first transmitter and the first receiver. One example method to implement the directional transmission may be for the second transmitter to beamform to the direction of the second receiver and also null in the direction of the first transmitter, first receiver and direction of first transmitter's directional transmission and reception at the same time.

The second transmitter and second receiver may share the entire length of the rest of TXOP between the first transmitter and first receiver. The second receiver may transmit its ACK frame corresponding to the data frame transmitted from the second transmitter using the same antenna pattern as it sends the SS-Resp frame. The second transmitter may receive the ACK frame sent back from the second receiver using the same antenna pattern in its data transmission to the second receiver.

Figure 10:
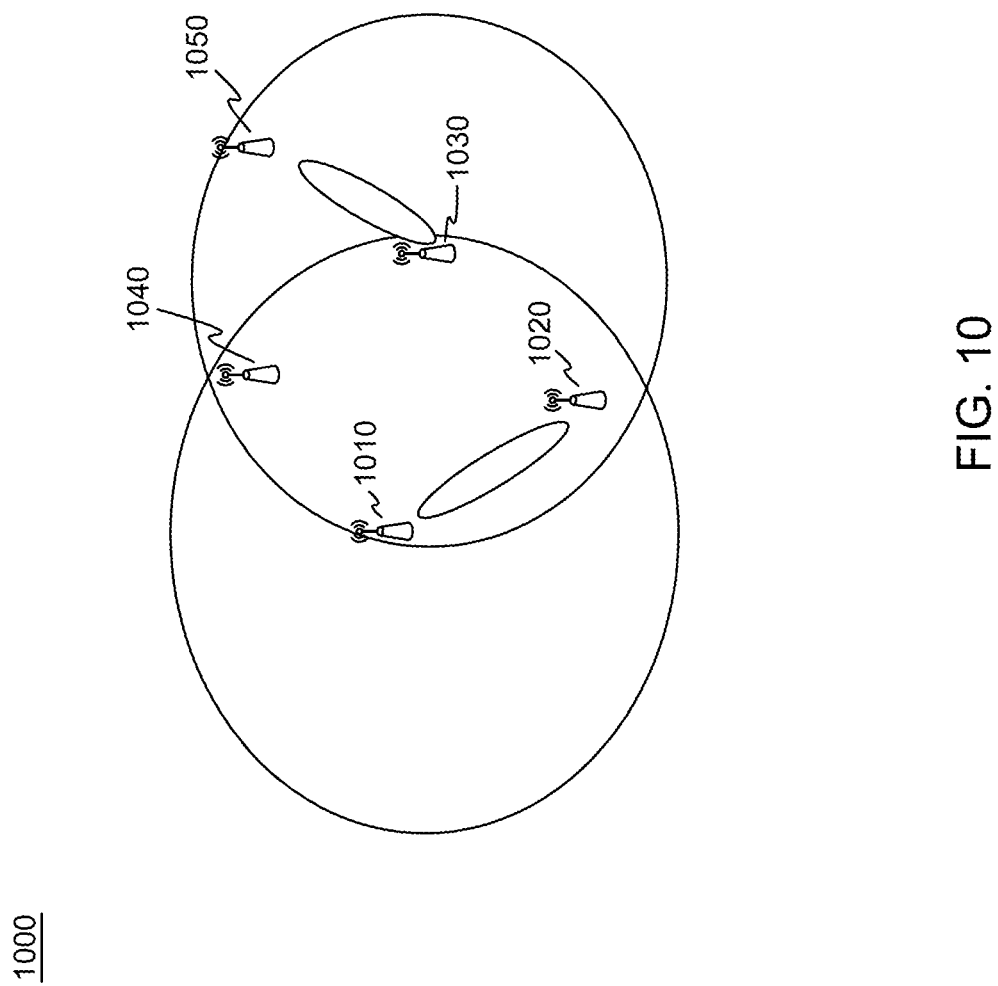
FIG. 10 is a diagram of another example of spatial sharing.

FIG. 10 is a diagram of another example of spatial sharing. As shown in diagram 1000, in an example, which may be referred to as Spatial Sharing Case 2, a second transmitter 1030 may receive an omni-Tx of a first transmitter 1010 and first receiver 1020, but not directional-Tx from the first transmitter 1010 to the first receiver 1020.

In an example method, which may be referred to as Method 1, a second transmitter 1030 may null the directional transmission/reception of the first receiver 1020 in all of its transmissions to a second receiver. This method may be the same as Method 1 for spatial sharing Case 1, except the second transmitter may identify this as Spatial Sharing Case 2.

In an example method, which may be referred to as Method 2, a second transmitter 1030 may null the direction of the first receiver 1020 and the direction of the first transmitter 1010 in all of its transmissions to a second receiver. This method may be the same as Method 2 for Spatial Sharing Case 1, except the second transmitter may identify this as Spatial Sharing Case 2 and its directional transmission may null the direction of the first transmitter and first receiver.

In an example, a node 1050 may respond to the second transmitter's 1030 directional SS-Req frame if it did not receive any omni-directional or directional transmission from the first transmitter 1010 and first receiver 1020. For example, node 1050 may respond to the second transmitter 1030 but node 1040 may not.

Figure 11:
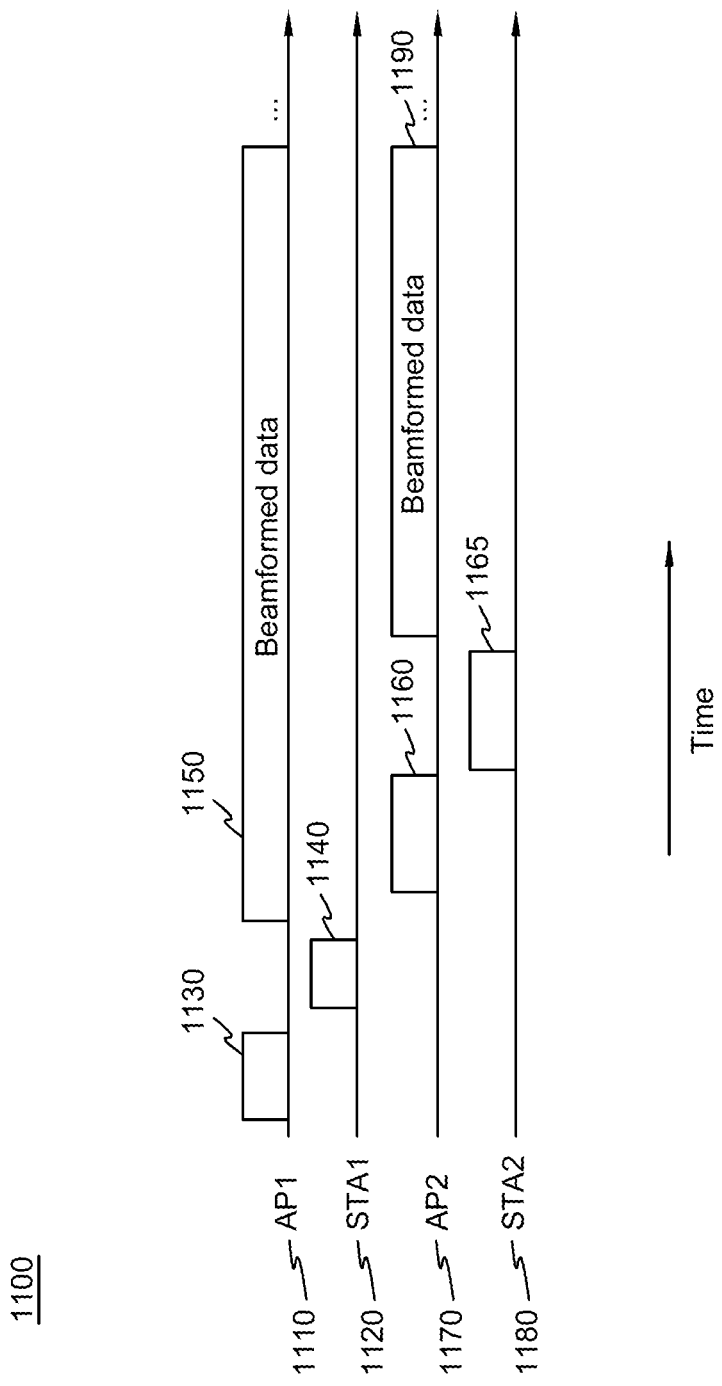
FIG. 11 is a diagram of an example of signaling in a spatial sharing scenario (SSS)

FIG. 11 is a diagram of an example of signaling in a spatial sharing scenario (SSS). As shown in scenario 1100, an AP1 1110 may start a frame exchange with an RTS 1130, which may be an omni-RTS, to solicit a CTS response 1140, which may be an omni-CTS, from a STA1 1120 and then use the omni-transmission to set up protection for the duration of a beamformed data transmission 1150.

Further, an AP2 1170 may receive the omni-transmissions of AP1 1110 and/or STA1 1120. For example, AP2 1170 may receive the frame exchange between AP1 1110 and STA1 1120. In this way, AP2 1170 may detect a SSS with an overlapping BSS based on the received frame exchange. In an example, AP may not receive the directional transmissions of AP1 1110 and/or STA1 1120.

Also, AP2 1170 may transmit a directional poll request 1160, such as an SS-Req frame, to STAs associate with AP2 1170. AP2 1170 may thereby null directional transmission associate with potentially interfering nodes base on the detected SSS. For example, AP2 1170 may null directional transmissions associate with AP1 1110 and STA1 1120. AP2

1170 may then receive a poll response 1165, which may be an SS-Resp frame, from at least one STA associated with AP2 1170. For example, AP2 1170 may receive the poll response 1165 from STA2 1180.

AP2 1170 may then transmit directional, beamformed data signals 1190 to the at least one STA, which may be STA2 1180. As a result, AP2 1170 may enable simultaneous beamformed transmission in the overlapping BSS.

Figure 12:
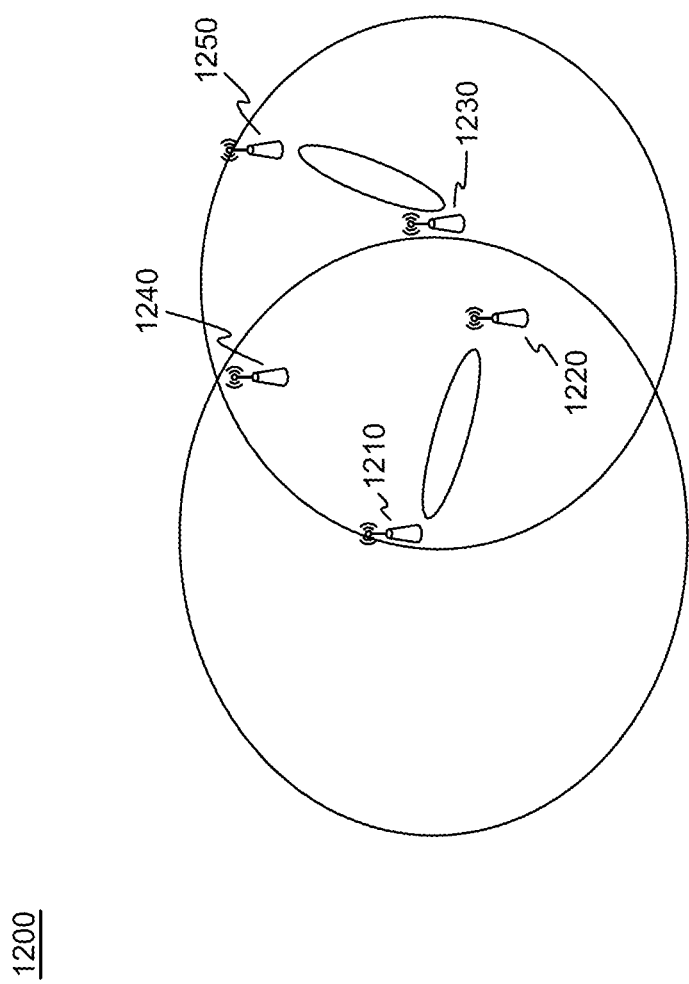
FIG. 12 is a diagram of a further example of spatial sharing.

FIG. 12 is a diagram of a further example of spatial sharing. As shown in diagram 1200, in an example, which may be referred to as Spatial Sharing Case 3, a second transmitter 1230 may receive an omni-transmission of the first receiver 1220 and the directional-transmission from the first transmitter 1210 to the first receiver 1220, but not the omni-transmission of the first transmitter 1210.

In an example method, which may be referred to as Method 1, a second transmitter 1230 may null the direction of the first receiver 1220 in all of its transmissions to a second receiver. This method may the same as method 1 for Spatial Sharing Case 1, except the second transmitter may identify this as Spatial Sharing Case 3.

In an example method, which may be referred to as Method 2, a second transmitter 1230 may null the direction of the first receiver 1220 and the direction of the first transmitter's 1210 directional transmission/reception. This method may be the same as method 2 for spatial sharing Case 1, except the second transmitter will identify this as spatial sharing case 3 and its directional transmission will null the direction of the first receiver and the direction of the directional transmission of node 1210.

In an example, a node 1250 may respond to the second transmitter's 1230 directional SS-Req frame if it did not receive any omni-directional or directional transmission from the first transmitter 1210 and first receiver 1220. For example, node 1250 may respond to the second transmitter 1230 but node 1240 may not.

Figure 13:
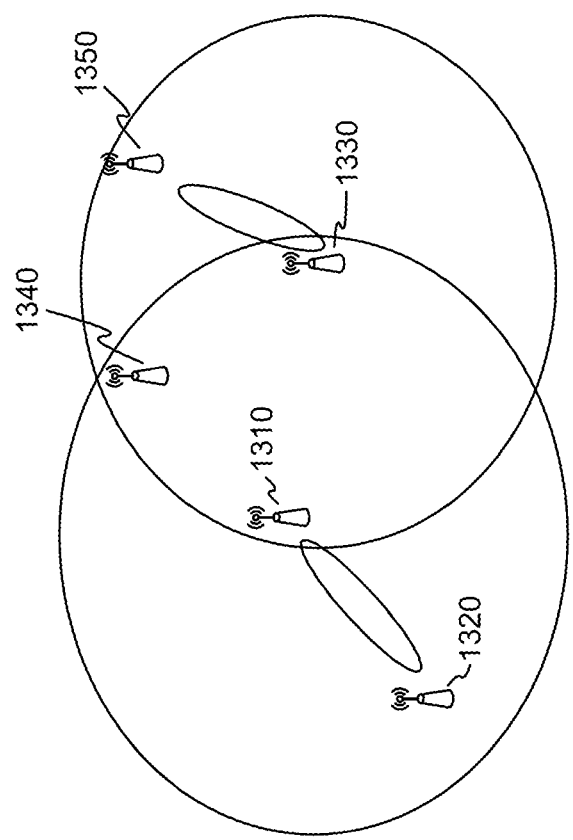
FIG. 13 is a diagram of an additional example of spatial sharing.

FIG. 13 is a diagram of an additional example of spatial sharing. As shown in diagram 1300, in an example, which may be referred to as spatial sharing case 4, a second transmitter 1330 may receive omni-transmission of the first transmitter 1310, but not the omni-transmission of the first receiver 1320 and the directional-transmission from the first transmitter 1310 to the first receiver 1320.

In an example method, which may be referred to as Method 1, a second transmitter 1330 may use an omni-direction transmission to a second receiver. The second transmitter 1330 may use the spatial sharing exchange procedures described herein to choose a second receiver. Consider an example as depicted in diagram 1300, for the purpose of illustration, where each STA or node can be an AP or non-AP STA. STA1 1310 may be a first transmitter, STA2 1320 may be a first receiver, and STA3 1330 may be a second transmitter. Upon detecting that this is spatial sharing scenario, which may be spatial sharing case 4, STA3 1330 may send an omni poll frame. If a potential second receiver STA does not have the capability of directional transmission and reception, then it may transmit only an omni-directional SS-Resp frame responding to the STA3's 1330 omni SS-Req frame. In this case, such a STA may respond with a SS-Resp frame only if it did not hear any omni-direction and directional transmission from STA1 1310 and STA2 1320. For example, STA5 1350 may respond to the second transmitter 1330 but STA4 1340 may not. If a potential second receiver STA has the capability of directional transmission and reception, then it can transmit directional SS-Resp frame responding to the STA3's 1330 SS-Req frame if the receiver-side spatial sharing conditions described herein are met.

In an example, after a successful spatial sharing exchange, an appropriate second receiver may be chosen for the purpose of spatial sharing of the TXOP between the first transmitter and first receiver. Then, the second transmitter may send an omni data frame to the second receiver without interfering with the directional transmission from the first transmitter to the first receiver. The second transmitter may terminate its transmission to the second receiver before the directional frame from the first transmitter to the first receiver is finished (e.g., before the first receiver transmits ACK back to the first transmitter). In an example, there may be two choices for the second receiver to transmit its ACK frame corresponding to the data frame transmitted from the second transmitter. In one choice, the second receiver may have to postpone its ACK frame corresponding to the data frame transmitted from the second transmitter until the TXOP between first transmitter and first receiver is finished. A Postponed Block ACK scheme may be used. In another choice, in order to allow the second receiver to send back ACK frame with existing ACK timing, the second transmitter may choose the length of the data frame to the second receiver to be aligned with the duration of the directional data frame from the first transmitter. In this way, both data frames from the first and second transmitters may end at the same time, then the second receiver may transmit its ACK frame corresponding to the data frame transmitted from the second transmitter a SIFS time after the end of the data frame from the first transmitter using the same antenna pattern as its response frame to the second transmitter in previous Spatial Sharing exchanges.

In an example method, which may be referred to as Method 2, a second transmitter 1330 may null the direction of the first transmitter 1310 in all of its transmission to a second receiver. A second transmitter 1330 may use the spatial sharing exchange procedures described herein to choose a second receiver. Consider an example as depicted in diagram 1300, for the purpose of illustration, where each STA can be an AP or non-AP STA. STA1 1310 may be the first transmitter, STA2 1320 may be a first receiver, and STA3 1330 may be the second transmitter. Upon detecting that this is spatial sharing case 4, STA3 1330 may send a directional poll frame, which may null the direction of STA1 1310. If a potential second receiver STA does not have the capability of directional transmission and reception, then it can transmit only an omni-directional SS-Resp frame responding to the STA3's 1330 directional SS-Req frame.

In this case, such a STA may respond with a SS-Resp frame only if it did not hear any omni-direction and directional transmission from STA1 1310 and STA2 1320. For example, STA5 1350 may respond but STA4 1340 may not. If a potential second receiver STA has the capability of directional transmission and reception, then it can transmit a directional SS-Resp frame responding to the STA3's 1330 SS-Req frame if the receiver-side spatial sharing conditions described herein are met.

After a successful spatial sharing exchange, an appropriate second receiver may be chosen for the purpose of spatial sharing of the TXOP between the first transmitter and first receiver. Then, the second transmitter may send a directional frame to the second receiver as long as it does not interfere with the first transmitter when it receives ACK from the first receiver. One example method to implement the directional transmission may be for the second transmitter to beamform to the direction of the second receiver and also null the direction of the first transmitter. The second transmitter and second receiver may share the entire length of the rest of a TXOP between the first transmitter and receiver. The second receiver may transmit its ACK frame corresponding to the data frame transmitted from the second transmitter using the same antenna pattern as it sends the SS-Resp frame. The second transmitter may receive the ACK frame sent back from the second receiver using the same antenna pattern in its data transmission to the second receiver.

Figure 14:
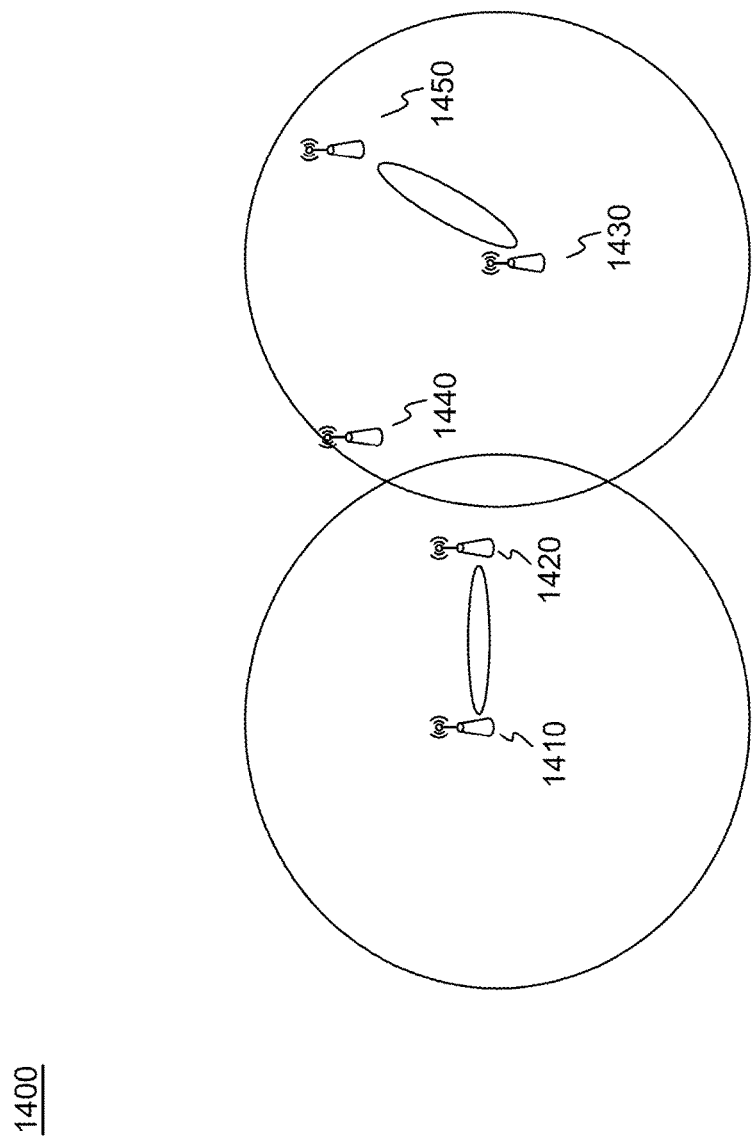
FIG. 14 is a diagram of yet another example of spatial sharing.

FIG. 14 is a diagram of yet another example of spatial sharing. As shown in diagram 1400, in an example, which may be referred to as spatial sharing case 5, a second transmitter 1430 may receive a directional-transmission from a first transmitter 1410 to a first receiver 1420, but not the omni-transmission of the first 1410 transmitter and the first receiver 1420.

In an example method, which may be referred to as Method 1, a second transmitter 1430 may use an omni-direction transmission to a second receiver. A second transmitter 1430 may use the spatial sharing exchange procedures described herein to choose a second receiver. Consider an example, as depicted in diagram 1400 for the purpose of illustration, where each STA can be an AP or non-AP STA. STA1 1410 may be the first transmitter, STA2 1420 may be the first receiver, and STA3 1430 may be the second transmitter. Upon detecting that this is spatial sharing scenario, which may be spatial sharing case 5, STA3 1430 may send an omni poll frame. If a potential second receiver STA does not have the capability of directional transmission and reception, then it can transmit only an omni-directional SS-Resp frame responding to the STA3's 1430 omni SS-Req frame. In this case, such a STA can respond with a SS-Resp frame only if it did not hear any omni-directional and directional transmission from STA1 1410 and STA2 1420. For example, STA5 1450 may respond but STA4 1440 may not. If a potential second receiver STA has the capability of directional transmission and reception, then it can transmit a directional SS-Resp frame responding to the STA3's 1430 SS-Req frame if the receiver-side spatial sharing conditions described herein are met.

After a successful spatial sharing exchange, an appropriate second receiver may be chosen for the purpose of spatial sharing of the TXOP between the first transmitter and first receiver. Then, the second transmitter may send an omni-data frame to the second receiver since such a transmission may not reach the first transmitter and receiver anyway. The second transmitter may transmit its omni-direction data frames to the second receiver up to the remaining length of the TXOP between the first transmitter and the first receiver after spatial sharing is established. In an example, there may be two choices for the second receiver to transmit its ACK frame corresponding to the data frame transmitted from the second transmitter. In one choice, the second receiver may have to postpone its ACK frame corresponding to the data frame transmitted from the second transmitter until the TXOP between first transmitter and first receiver is finished. A postponed Block ACK scheme can be used. In another choice, in order to allow the second receiver to send back an ACK frame with existing ACK timing, the second transmitter may choose the length of its data frame to the second receiver to end at the same time as with one of the directional data frames in the TXOP between the first transmitter and the first receiver. In this way, when the second transmitter switches to receive ACK frame from the second receiver, it may not be interfered by the directional transmission between the first transmitter and receiver. Then the second receiver may transmit its ACK frame corresponding to the data frame transmitted from the second transmitter a SIFS time after the end of the data frame from the first transmitter using the same antenna pattern as its response frame to the second transmitter in previous Spatial Sharing exchanges.

In an example method, which may be referred to as Method 2, a second transmitter 1430 may null the direction of the first transmitter's 1410 directional transmission and reception in all of its transmission to a second receiver. This method may be the same as method 2 for spatial sharing Case 1 and 4, except the second transmitter 1430 may identify this as spatial sharing case 5 and its directional transmission may null only the direction of the first transmitter's 1410 directional transmission.

Example procedures for medium access after the processing of preambles may be used to support correct functioning of MAC after the processing of a preamble when the STA may decide that it may ignore the remainder of the packet based wholly or partly on the information contained in the preamble, in a first part of the packet, or in an earlier part of the packet. For example, such a decision may be made in the case of spatial sharing when it is expected that a new transmission or reception at the STA may not impact the ongoing transmission that is destined for another STA. In another example, such a decision may be made when it is determined that the packet being received is an OBSS transmission and may be ignored for higher medium access efficiency.

FIG. 15 is a diagram of an example of a method of continued back-off. In examples, the receiving procedures 1500 for the STA associated with the continued backoff as illustrated in FIG. 15 may have one or more of the following steps. For example, a STA may compare the energy level in the medium and an energy detection threshold. The energy detection threshold may be a CCA threshold.

In an example, a frame 1510 may be transmitted and may contain a preamble or a first part 1512, a MAC header 1514 and a frame body 1516. A STA may receive a wireless signal. An energy level of the received signal may exceed a CCA threshold. The STA may receive a wireless signal including the preamble or a first part 1512 of the packet 1510. In an example, the STA may receive the preamble or a first part 1512 of the packet 1510 via a beamformed signal. In another example, the STA may receive the preamble or a first part 1512 of the packet 1510 via an omni-directional signal. The STA may determine, using a carrier sense multiple access (CSMA) protocol, to ignore the payload portion of the packet based on information contained in the preamble or a first part 1512. The STA may also adjust the CCA threshold to account for the payload portion of the packet. In addition, the STA may conduct CSMA medium access during the payload and/or remainder portion of the packet using the adjusted CCA threshold. The STA may access a channel with an updated energy detection level. For example, the STA may conduct CSMA medium access on the channel with an updated energy detection level.

A frame 1510 may be transmitted and may contain a preamble or a first part 1512, a MAC header 1514 and a frame body 1516. Further, a STA may detect energy on the medium and then the PMD layer may issue a PMD_RSSI-.indication to indicate that increased energy has been detected. The PMD_RSSI.indication may provide the detailed measured RSSI value RSSI_measured.

The PHY layer may then issue a PHY_CCA.indication (Status=busy), at which point the MAC layer may set the MAC/CCA status to busy 1520. The PHY layer may issue a PHY_RXSTART.indication(RXVECTOR) to the MAC layer with the RXVECTOR containing the information obtained from the preamble 1510.

The MAC layer or any other function within the STA may determine, partly or wholly based on the information contained in the preamble 1512 and/or RXVECTOR, that the remainder of the frame 1510, such as the MAC header 1514 and frame body 1516, may be ignored. The MAC layer may make the decision to ignore the remainder of the frame based on the parameters in the preamble and/or RXVECTOR, such as PAID, Sector ID, Group ID, Color, etc. In this way, the STA may decide to drop the packet based on information in the preamble 1512.

Once it has been determined that the remainder for the frame 1510 may be ignored, the MAC layer may issue a PHY_RXSTOP.request primitive to the PHY layer to request that the PHY layer stop with the reception of the current packet. The PHY layer or the STA, when receiving the PHY_RXSTOP.request may stop the reception of the current frame 1510 and return to RX/IDLE state 1530. An addition may be added to the receive state machine when the PHY_RXSTOP.request is received and the STA may return to RX/IDLE state 1530. The PHY layer may respond with a PHY_RXSTOP.confirm to indicate that the PHY layer has stopped the reception of the current packet. Alternatively, a PHY-RXEND.indication may be used by the PHY layer to indicate to the MAC layer that it has received the PHY-RXSTOP.request and has stopped the reception of the current frame 1510.

The PHY layer or the STA may set its energy detection level and signal detection level using the current energy or RSSI level of the received preamble and some margin, such as Energy_Detection_Margin or Signal_Detection_Margin. For example, the updated Energy_Detection_Level may be equal to RSSI_current+Energy_Detection_Margin or equal to CCA_Level+Energy_Detection_Level; the updated Signal_Detection_Level may be equal to RSSI_current+Signal_Detection_Margin or equal to CCA_Level+Signal_Detection_Level; the updated CCA_Level may be equal to RSSI_current+CCA_Level_Margin. In addition, all updated values described above may also include some scalar values or be a function of parameters described above. The updated values may be valid for the duration of the packet obtained from the preamble 1512.

The MAC Layer or the STA may resume normal medium access procedures after a certain period of time. For example, the MAC Layer may resume backoff 1550 after some period of time; such a period of time may take into account propagation time, processing time that is needed for a STA to determine that the current packet should be ignored partially or wholly based on the information obtained from the preamble. Such a period of time may be a slot, a SIFS, a PIFS, a DIFS or any other period of time.

The PHY_RXSTOP.request primitive issued by the MAC layer may contain one or more parameters such as Energy_Detection_Level, Signal_Detection_Level, Duration, Energy_Detection_Change, Signal_Detection_Change, and RX_State. Further, the PHY Layer may update its Energy_Detection_Level and the Signal_Detection_Level using the relevant parameters such as Energy_Detection_Level and Signal_Detection_Level from the PHY_RXSTOP.request. The PHY Layer may update its Energy_Detection_Level and the Signal_Detection_Level using the relevant parameters such as Energy_Detection_Change and Signal_Detection_Change from the PHY_RXSTOP.request. For example, the updated Energy_Detection_Level may be equal to current Energy_Detection_Level+Energy_Detection_Change; the updated Signal_Detection_Level may be equal to current Signal_Detection_Level+Signal_Detection_Margin. Also, the updated Energy_Detection_Level and Signal_Detection_Level may be valid for the duration of the packet obtained from the preamble or for a Duration that is equal to the parameter Duration in the PHY_RXSTOP.request. In addition, the RX_State may specify the state to which the STA/PHY layer should go after receiving PHY_RXSTOP.request. Some possible values for RX_State may be, RX/IDLE, PowerSave. When the RX_State equals to RX/IDLE, the PHY layer should continue to sense the channel, possibly using a new CCA levels such as Energy_Detection_Level and/or Signal_Detection_Level. If the backoff process is suspended 1540, it may be resumed 1550 after some pre-defined period, such as a SIFS, PIFS or DIFS or a slot, from some point of time, such as the end of the preamble. If the RX_State equals to PowerSave, then the STA/PHY layer may go into power saving mode.

The determination of the RX_State for the STA and/or PHY layer may depend on the technology used. In case of spatial sharing, if it can be determined that the ongoing packet and any pending transmission or reception to be initiated by the receiving STA does not impact each other, then the RX_State may be set to RX/IDLE; any suspended backoff 1540 may be resumed 1550 after some set period of time. If any pending transmission of packets that may be initiated by the receiving STA may be in conflict of the current ongoing packet, the RX_State may be set to PowerSave to provide higher energy efficiency. In case of technologies intended for increased medium access efficiency, in which OBSS packets are ignored (such as adaptive CCA settings), the RX_State may be set RX/IDLE with increased CCA, and/or Energy Detection and/or Signal Detection levels.

In the following examples, the various primitives used by the MAC and the PHY layers to ensure correct medium access procedures after receiving a preamble are described. In an example, a PHY-RXSTOP.request primitive may be used. The PHY-RXSTOP.request primitive may be a request by the MAC layer to the local PHY entity to terminate the reception of the PLCP protocol data unit (PPDU) currently being received.

The following describes example semantics of the service primitive. The primitive may provide the following parameters.

```
PHY-RXSTOP.request(
    Signal_Detection_Level,
    Energy_Detection_Level,
    Duration,
    Signal_Detection_Change,
    Energy_Detection_Change,
    RX_State
)
```

The Signal_Detection_Level parameter may be an integer or a value that the PHY entity shall use as a threshold value of RSSI or RCPI or other power measurement used for signal detections. The Energy_Detection_Level parameter may be an integer or a value that the PHY entity shall use as a threshold value of RSSI or RCPI or other power measurement used for energy detection. The Duration parameter may be an interval specified in µs, ms, TU or other time units. The Duration parameter may provide the validity duration for the parameter changes specified in the PHY-RXSTOP.request primitive, such as Signal_Detection_Level, Energy_Detection_Level, Signal_Detection_Change, Energy_Detection_Change, or RX_State. The Duration value may be obtained from the PLCP header of the PPDU currently being received.

The Signal_Detection_Change may be a signed or unsigned integer that specifies the change in threshold value of RSSI or RCPI or other power measurement used for signal detection. The Energy_Detection_Change may be a signed or unsigned integer that specifies the change in threshold value of RSSI or RCPI or other power measurement used for energy detection. The RX_State parameter may take the value RX/IDLE or PowerSaving.

This primitive may be issued or generated by the MAC Layer to the local PHY entity when the MAC Layer has determined that the frame currently being received by the PHY entity should be terminated.

The effect of receipt of this primitive is that the PHY Layer may terminate or end the reception of the PPDU that is currently being received. If an RX_State parameter is included in the primitive, the PHY layer may enter the RX_State such as RX/IDLE or PowerSaving as specified in the PHY-RXSTOP.request primitive. If Signal_Detection_Level and/or Energy_Detection_Level parameters are included in the primitive, the PHY layer may adapt the value of the Signal_Detection_Level and Energy_Detection_Level as its threshold level for signal detection and/or energy detection. If a Duration parameter is included in the primitive, the changes in signal and energy detection levels may be reverted when the interval specified by the Duration expires. If Signal_Detection_Change and/or Energy_Detection_Change parameters are included in the primitive, the PHY layer may update its threshold level for signal detection and/or energy detection using Signal_Detection_Change and/or Energy_Detection_Change. If a Duration parameter is included in the primitive, the changes in signal and energy detection levels may be reverted when the interval specified by the Duration expires. The RX_State of the PHY layer may be RX/IDLE when the interval specified by the Duration expires, if no additional valid energy detection, signal detection or valid preamble have taken place, or when the packet is transmitting or receiving.

In another example, a PHY-RXSTOP.confirm primitive may be used. The PHY-RXSTOP.confirm primitive may be issued by the PHY layer to the local MAC entity to confirm the termination of the reception of the PPDU that was currently being received. This primitive may be issued by the PHY layer in response to a PHY-RXSTOP.request primitive issued by the MAC entity. This primitive may be issued by the PHY layer to the local MAC entity to confirm the change in CCA level, Signal Detection threshold levels, Energy Detection threshold levels as requested by the MAC entity in a PHY-RXSTOP.request primitive.

The following describes example semantics of the service primitive. The primitive may provide the following parameters.

```
PHY-RXSTOP.confirm(
    Status,
    Signal_Detection_Level,
    Energy_Detection_Level,
    Duration,
    Signal_Detection_Change,
    Energy_Detection_Change,
    RX_State
    )
```

The Status parameter may have the following values: Success, Failed, Failed_Without_Reason. The Signal_Detection_Level parameter may be an integer or a value that the PHY entity has adapted as a threshold value of RSSI or RCPI or other power measurement used for signal detections. The Energy_Detection_Level parameter may be an integer or a value that the PHY entity has adapted as a threshold value of RSSI or RCPI or other power measurement used for energy detection. The Duration parameter may be an interval specified in µs, ms, TU or other time units. The Duration parameter may provide the validity duration for the parameter changes that the PHY layer has adapted, such as Signal_Detection_Level, Energy_Detection_Level, Signal_Detection_Change, Energy_Detection_Change, or RX_State. The Signal_Detection_Change may be a signed or unsigned integer that specifies the change in threshold value of RSSI or RCPI or other power measurement that the PHY layer has adapted for signal detection. The Energy_Detection_Change may be a signed or unsigned integer that specifies the change in threshold value of RSSI or RCPI or other power measurement that the PHY layer adapted for energy detection. The RX_State parameter may take the value RX/IDLE or PowerSaving and indicate the current RX_State of the PHY Layer.

This primitive may be issued or generated by the PHY Layer to the local MAC entity when the PHY layer has completed one or more of the following operations: the PHY layer has terminated the reception of the PPDU that was being received; the PHY layer has transitioned into the RX_State desired, e.g., as specified by the PHY-RXSTOP.request primitive; and the PHY layer has adapted new or updated its signal and energy detection threshold levels. The effect of receipt of this primitive by the MAC entity may be unspecified.

In another example, a PHY-RXEND.indication primitive may be used. In addition to the existing functionalities of PHY-RXEND.indication, the PHY-RXEND.indication primitive may be expanded to be issued by the PHY layer to the local MAC entity to confirm the termination of the reception of the PPDU that was currently being received. This primitive may be issued by the PHY layer in response to a PHY-RXSTOP.request primitive issued by the MAC entity. This primitive may be issued by the PHY layer to the local MAC entity to confirm the change in CCA level, Signal Detection threshold levels, Energy Detection threshold levels as requested by the MAC entity in a PHY-RXSTOP.request primitive.

The following describes example semantics of the service primitive. The primitive may provide the following parameters.

```
PHY-RXEND.confirm(
    RXERROR,
    RXVECTOR,
        Status,
        Signal_Detection_Level,
        Energy_Detection_Level,
        Duration,
        Signal_Detection_Change,
        Energy_Detection_Change,
        RX_State
        )
```

The existing RXERROR parameter may have an additional value: Stopped_As_Requested to indicate the reception of the current PPDU has been stopped per request by, e.g., the MAC layer. The existing RXVECTOR may remain unchanged. The Status parameter may have the following values: Success, Failed, Failed_Without_Reason, Stopped_As_Requested. The Signal_Detection_Level parameter may be an integer or a value that the PHY entity has adapted as a threshold value of RSSI or RCPI or other power measurement used for signal detections. The Energy_Detection_Level parameter may be an integer or a value that the PHY entity has adapted as a threshold value of RSSI or RCPI or other power measurement used for energy detections. The Duration parameter may be an interval specified in μs, ms, TU or other time units. The Duration parameter may provide the validity duration for the parameter changes that the PHY layer has adapted, such as Signal_Detection_Level, Energy_Detection_Level, Signal_Detection_Change, Energy_Detection_Change, or RX_State. The Signal_Detection_Change may be a signed or unsigned integer that specifies the change in threshold value of RSSI or RCPI or other power measurement that the PHY layer has adapted for signal detection. The Energy_Detection_Change may be a signed or unsigned integer that specifies the change in threshold value of RSSI or RCPI or other power measurement that the PHY layer adapted for energy detection. The RX_State parameter may take the value RX/IDLE or PowerSaving and indicates the current RX_State of the PHY Layer.

In addition to the existing cases when the PHY-RXEND.indication primitive is generated, the PHY-RXEND.indication primitive may be issued by the PHY Layer (e.g., in response to a PHY-RXSTOP.request primitive issued by the MAC entity) to the local MAC entity when the PHY layer has completed one or more of the following operations: the PHY layer has terminated the reception of the PPDU that was being received; the PHY layer has transitioned into the RX_State desired, e.g., as specified by the PHY-RXSTOP.request primitive; and the PHY layer has adapted new or updated its signal and energy detection threshold levels.

In an example, the RSSI values above may be replaced by other power measurement values such as RCPI, or any other type of power measurement.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
receiving, by the STA, a wireless signal including a preamble of a packet, wherein a received energy level of the signal exceeds a clear channel assessment (CCA) threshold;
determining, by the STA, using a carrier sense multiple access (CSMA) protocol, to ignore a payload portion of the packet based on information contained in the preamble;
adjusting, by the STA, the CCA threshold to account for the payload portion of the packet; and
conducting, by the STA, a CSMA medium access during the payload portion of the packet using the adjusted CCA threshold.

2. The method of claim 1, wherein the preamble of the packet is received by the STA via a beamformed signal.

3. The method of claim 1, wherein the preamble of the packet is received by the STA via an omni-directional signal.

4. The method of claim 1, wherein the determination to ignore the payload portion is based on an RXVECTOR.

5. The method of claim 1, further comprising:
issuing, by the STA, a primitive to stop reception of the packet.

6. The method of claim 5, wherein the primitive is a PHY_RXSTOP.request primitive.

7. The method of claim 1, wherein the CCA threshold is a received signal strength indicator (RSSI) level.

8. The method of claim 1, wherein the adjusting includes accounting for a received energy level of the payload portion of the packet.

9. The method of claim 1, wherein the adjusting includes setting the CCA threshold using the received energy level of the payload portion of the packet and a margin.

10. A station (STA) comprising:
a processor and a transceiver configured to receive a wireless signal including a preamble of a packet, wherein an energy level of the signal exceeds a clear channel assessment (CCA) threshold;
the processor and transceiver further configured to determine, using a carrier sense multiple access (CSMA) protocol, to ignore a payload portion of the packet based on information contained in the preamble;
the processor further configured to adjust the CCA threshold to account for the payload portion of the packet; and
the processor and transceiver further configured to conduct a CSMA medium access during the payload portion of the packet using the adjusted CCA threshold.

11. The STA of claim 10, wherein the preamble of the packet is received by the processor and transceiver via a beamformed signal.

12. The STA of claim 10, wherein the preamble of the packet is received by the processor and transceiver via an omni-directional signal.

13. The STA of claim 10, wherein the determination to ignore the payload portion is based on an RXVECTOR.

14. The STA of claim 10, further comprising:
the processor and transceiver further configured to issue a primitive to stop reception of the packet.

15. The STA of claim 14, wherein the primitive is a PHY_RXSTOP.request primitive.

16. The STA of claim 10, wherein the CCA threshold is a received signal strength indicator (RSSI) level.

17. The STA of claim 10, wherein the adjusting includes accounting for a received energy level of the payload portion of the packet.

18. The STA of claim 10, wherein the adjusting includes setting the CCA threshold using the received energy level of the payload portion of the packet and a margin.

* * * * *